United States Patent
Mishaeloff

(10) Patent No.: US 12,402,982 B2
(45) Date of Patent: Sep. 2, 2025

(54) MATRICES INCLUDING CROWNS FOR DENTAL RESTORATION

(71) Applicant: Iveneer LTD, Petach Tikva (IL)

(72) Inventor: Itay Mishaeloff, Tel Aviv (IL)

( * ) Notice: Subject to any disclaimer, the term of this patent is extended or adjusted under 35 U.S.C. 154(b) by 561 days.

(21) Appl. No.: 17/659,179

(22) Filed: Apr. 14, 2022

(65) Prior Publication Data

US 2022/0287801 A1 Sep. 15, 2022

Related U.S. Application Data

(60) Continuation-in-part of application No. 17/646,681, filed on Dec. 31, 2021, and a continuation-in-part of application No. 17/173,216, filed on Feb. 11, 2021, now Pat. No. 11,903,787, and a division of application No. 15/856,087, filed on Dec. 28, 2017, now Pat. No. 10,952,815.

(51) Int. Cl.
*A61C 5/85* (2017.01)
*A61C 5/20* (2017.01)
*A61C 13/15* (2006.01)

(52) U.S. Cl.
CPC .......... *A61C 5/85* (2017.02); *A61C 5/20* (2017.02); *A61C 19/003* (2013.01)

(58) Field of Classification Search
CPC .... A61C 5/85; A61C 5/82; A61C 5/80; A61C 5/20; A61C 5/30; A61C 5/70; A61C 5/77; A61C 5/35
See application file for complete search history.

(56) References Cited

U.S. PATENT DOCUMENTS

| | | | | |
|---|---|---|---|---|
| 2,771,677 A | * | 11/1956 | Curry | A61C 5/85 433/39 |
| 3,421,222 A | * | 1/1969 | Newman | A61C 5/62 433/226 |
| 5,114,341 A | | 5/1992 | Kassel | |
| 5,695,339 A | * | 12/1997 | Abere | A61C 5/30 433/90 |
| 2005/0042577 A1 | * | 2/2005 | Kvitrud | A61C 5/77 433/218 |
| 2017/0011949 A1 | | 1/2017 | Saiki et al. | |
| 2017/0119499 A1 | | 5/2017 | Clark | |
| 2019/0008320 A1 | | 1/2019 | Cheng | |
| 2019/0020116 A1 | | 1/2019 | Hammes et al. | |
| 2019/0083208 A1 | | 3/2019 | Hansen et al. | |
| 2019/0201165 A1 | | 7/2019 | Mishaeloff | |

FOREIGN PATENT DOCUMENTS

WO 2014/053480 A1 4/2014

OTHER PUBLICATIONS

ISR; Israel Patent Office; Jerusalem; Apr. 27, 2023.
Written Opinion of the International Searching Authority; Israel Patent Office; Apr. 27, 2023.

* cited by examiner

*Primary Examiner* — Jacqueline T Johanas
*Assistant Examiner* — Shannel Nicole Belk
(74) *Attorney, Agent, or Firm* — Patshegen IP; Moshe Pinchas

(57) ABSTRACT

A dental matrix for forming a crown on a tooth includes a body having a expandable tab, which allows the diameter of an opening to be expanded for removal of the matrix from the formed crown.

14 Claims, 20 Drawing Sheets

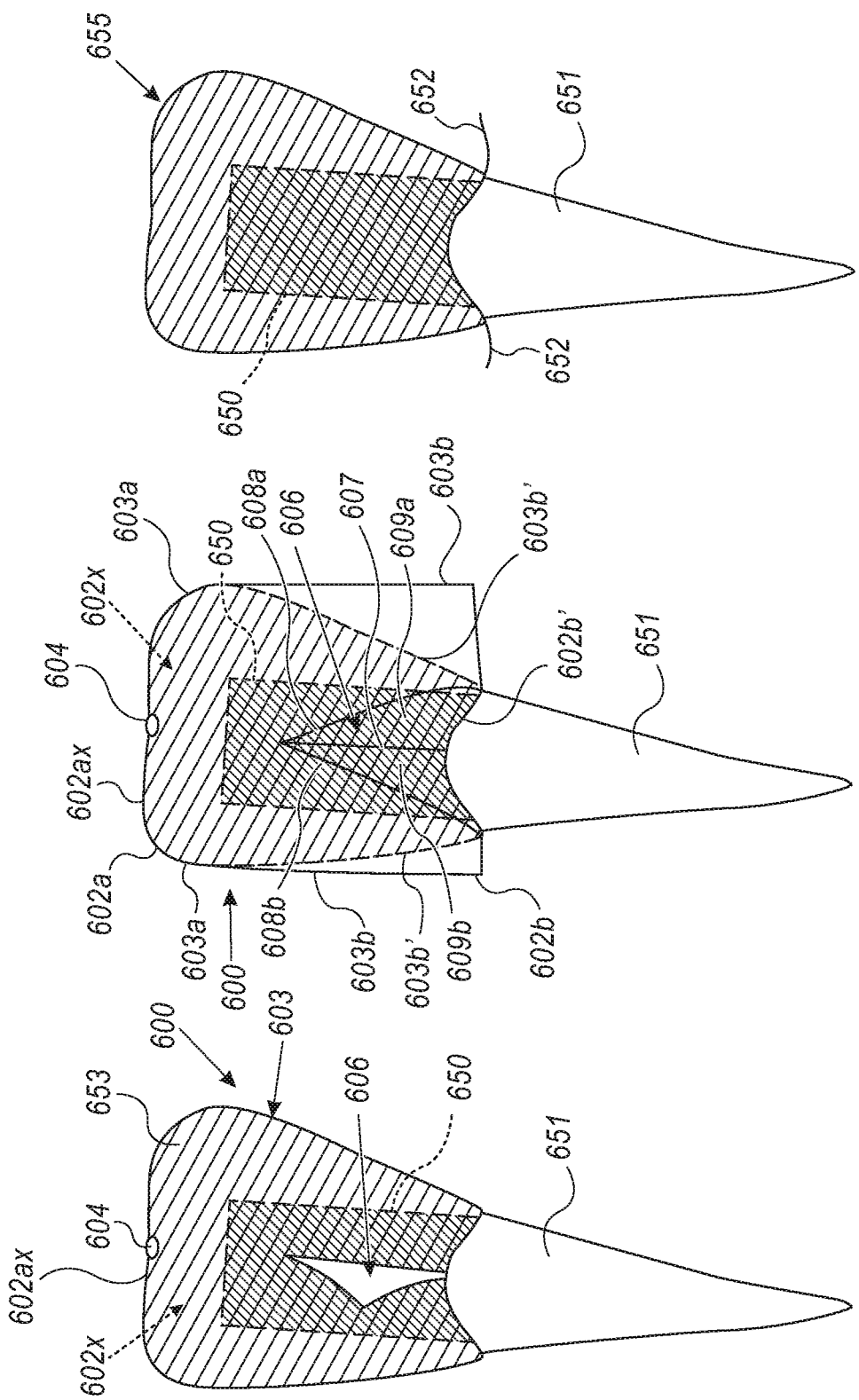

MATRICES INCLUDING CROWNS FOR DENTAL RESTORATION

CROSS-REFERENCES TO RELATED APPLICATIONS

This application is a continuation in part application of commonly owned U.S. patent application Ser. No. 17/646,681, entitled: MATRICIES FOR DENTAL RESTORATION, filed on Dec. 31, 2021, which is a continuation in part application of commonly owned U.S. patent application Ser. No. 17/173,216, entitled: MATRICIES FOR DENTAL RESTORATION, filed on Feb. 11, 2021, which is a Divisional of commonly owned U.S. patent application Ser. No. 15/856,087, entitled: MATRICIES FOR DENTAL RESTORATION, filed on Dec. 28, 2017, now U.S. Pat. No. 10,952,815, the disclosures of the aforementioned applications are all incorporated by reference herein.

TECHNICAL FIELD

The present invention relates generally to apparatus and methods for dental restoration. More particularly, the present invention relates to apparatus and methods for placing dental veneers on teeth.

BACKGROUND OF THE INVENTION

Cosmetic dentistry generally relates to the process of enhancing the aesthetics of the dental crown, that portion of the tooth beyond the gum line which is covered with enamel. One example of such a process comprises putting a veneer on the tooth or putting a mold, made from a dental impression, on the tooth, filling the mold with a dental composite or acrylic, to create the veneer, while the mold is separate from the teeth, and then transferring the veneer from the mold to the tooth. The veneer is placed on the tooth and is then cured or otherwise hardened. The veneer is now integral with the tooth, and now may be shaped or polished, for example, by techniques including resurfacing the tooth. These aforementioned techniques are fairly expensive and time consuming, as they require considerable preparation, and usually cannot be performed in a single dental office visit

SUMMARY OF THE INVENTION

Embodiments of the present invention provide a matrix adapted for the specific tooth type (e.g., premolar, molar, canine, incisor, palatal, lingual) being treated in a single treatment, which results in a veneer on the tooth, which may then be resurfaced, for an aesthetically pleasing appearance.

Embodiments of the invention are such that the procedure for placing a veneer on a tooth with the disclosed matrix is a highly accurate process, extremely hygienic and sanitary, and results in a smooth veneer indistinguishable from the tooth the veneer has repaired.

Embodiments of the invention are directed to a matrix for a dental treatment. The matrix comprises: a facial member for covering a tooth, at least a portion of the facial member configured to cover the tooth such that a cavity is created between the facial member and the tooth, and, the portion of the facial member that forms the cavity is includes at least one aperture; and, first and second tab members disposed on opposite sides of the facial member, each of the first and second tab members extending outward and of a thickness for frictionally fitting between the covered tooth and each of the respective adjacent teeth, to maintain the matrix in place; and, at least a portion of each of the first and second tab members including a cut-out portion configured for seating the matrix at the gum, and allowing the matrix to be moved about the gum, for example, pivoted, to adjust the dimensions of the cavity, at a first end of the tab member, each of the first and second tab members configured for being bent inward, such that each second end of the tab member forms a gripping portion, which when moved adjusts the dimensions of the cavity.

Optionally, the facial member includes a facial portion configured for covering the tooth along the buccal surface, and a chewing surface cap extending from the facial portion and configured for covering at least the chewing surface of the tooth, and the chewing surface cap includes the at least one aperture.

Optionally, each of the first and second tab members include: a tab, at least a portion of the tab including the cut out portion; a wing extending from the tab; and, the tab meets the wing at a fold line, the wing of each tab member being bendable about the fold line to form the gripping member.

Optionally, the facial portion includes oppositely disposed lateral edges and the tabs of the first and second tab members extend from the respective oppositely disposed lateral edge.

Optionally, wherein the chewing surface cap extends between the oppositely disposed lateral edges at a first end of the facial portion.

Optionally, the facial portion includes a gingival edge between the oppositely disposed lateral edges at a second end, opposite the first end, the gingival edge configured for contacting a tooth slightly below the gum line.

Optionally, the gingival edge is configured for contacting the tooth approximately 1 mm below the gum line.

Optionally, at least the facial portion includes a light transmissive material.

Optionally, the light transmissive material allows for the transmission of ultra violet (UV) light. Optionally, the facial member and first and second tab members are arranged as an integral member.

Optionally, the integral member is of a substantially uniform thickness and includes a flexible material.

Optionally, the facial portion includes an outer buccal surface and an inner dental surface, and the inner dental surface is textured so as to replicate the texture of the tooth.

Optionally, the at least one aperture includes a plurality of apertures.

Optionally, the cut-out portions are configured for contacting the tooth approximately 1 mm below the gum line.

Embodiments of the invention are directed to a method for repairing a tooth. The method comprises: providing a matrix for a dental treatment, placing the matrix over a tooth to form a cavity between the tooth and the facial member; bending the first and second tab members inward to surround the tooth; placing a curable material into the cavity; and, curing the curable material to form a veneer on the tooth. The matrix comprises: a facial member for covering a tooth, at least a portion of the facial member of a light transmissive material and at least a portion the facial material configured to cover the tooth such that a cavity is created between the facial member and the tooth, and, the portion of the facial member that forms the cavity is includes at least one aperture; and, first and second tab members disposed on opposite sides of the facial member, each of the first and second tab members extending outward and of a thickness for frictionally fitting between the covered tooth and each of the respective adjacent teeth, to maintain the matrix in place;

and, at least a portion of each of the first and second tab members including a cut-out portion configured for seating the matrix at the gum, and allowing the matrix to be moved about the gum, for example, pivoted, to adjust the dimensions of the cavity, at a first end of the tab member, each of the first and second tab members configured for being bent inward, such that each second end of the tab member forms a gripping portion, which when moved adjusts the dimensions of the cavity.

Optionally, the facial member includes a gingival edge at an end opposite the end with the at least one aperture; and, the method additionally comprises placing the gingival edge into contact with the tooth below the gum line.

Optionally, the method additionally comprises removing the matrix from the tooth.

Optionally, the curing is performed by applying light to the curable material.

Optionally, curable material is an Ultra Violet (UV) light curable material and the light applied to the UV curable material includes UV light.

Optionally, the bending the first and second tab members inward includes bending the second ends of each of the tab members outward to form a gripping portion for the matrix, and, moving the matrix at the gripping portion to adjust the dimensions of the cavity.

Optionally, the moving the matrix at the gripping portion to adjust the dimensions of the cavity includes causing the matrix to pivot about the gums on opposite sides of the tooth to adjust the dimensions of the cavity and control the thickness of the veneer (produced by the method).

Optionally, the placing the curable material into the cavity includes injecting the curable material into the cavity.

Optionally, the injecting the curable material into the cavity includes injecting under pressure to eliminate air bubbles and air gaps in the curable material.

Optionally, the bending the first and second tab members inward to surround the tooth creates at least one of a palatal shell (wall) for upper teeth or a lingual shell (wall) for lower teeth for building missing portions of the tooth.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention, and may not be to scale. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1A:
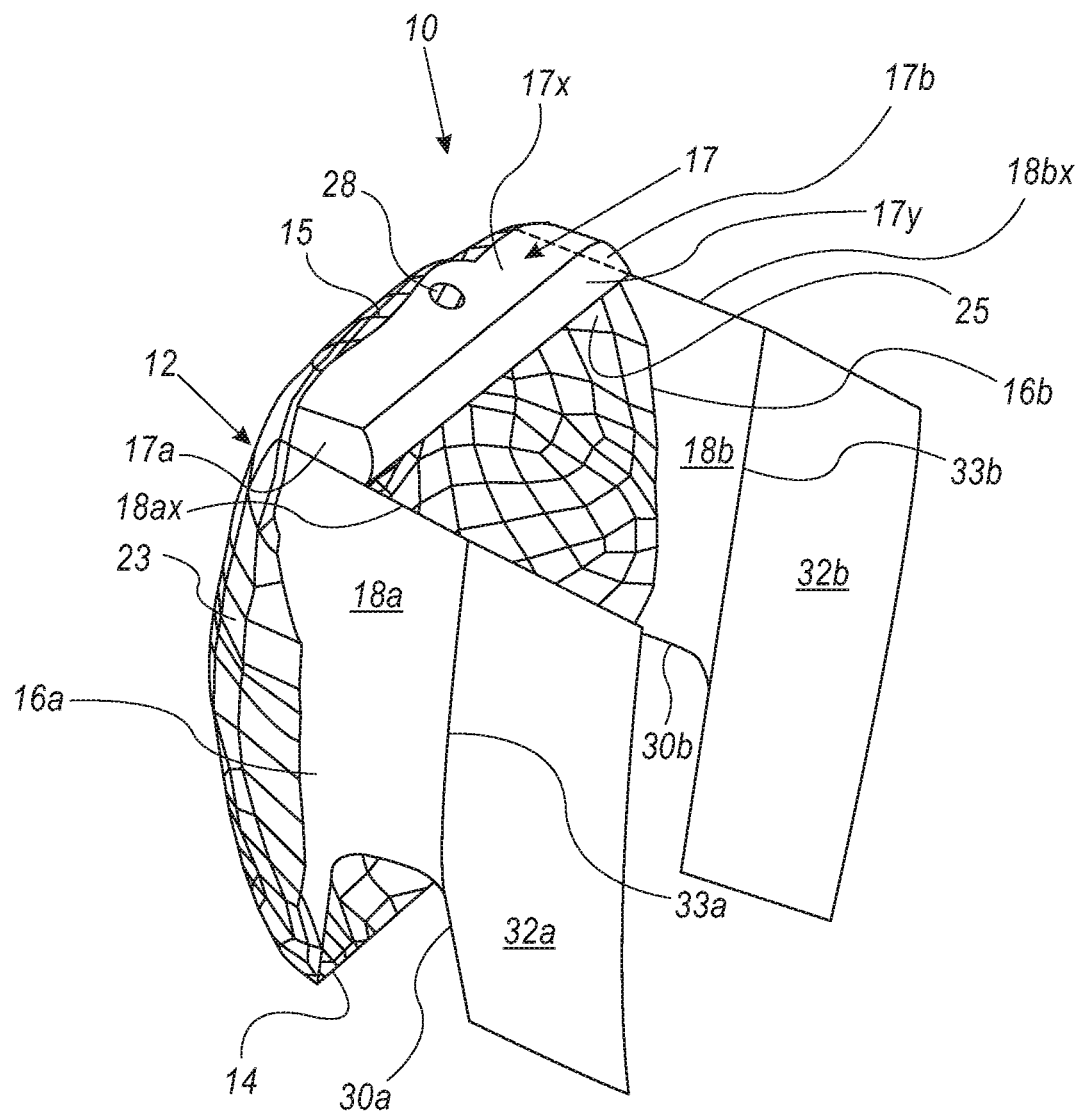
FIGS. 1A and 1B are perspective views of a matrix for use in creating a veneer in accordance with embodiments of the invention.
Figure 1B:
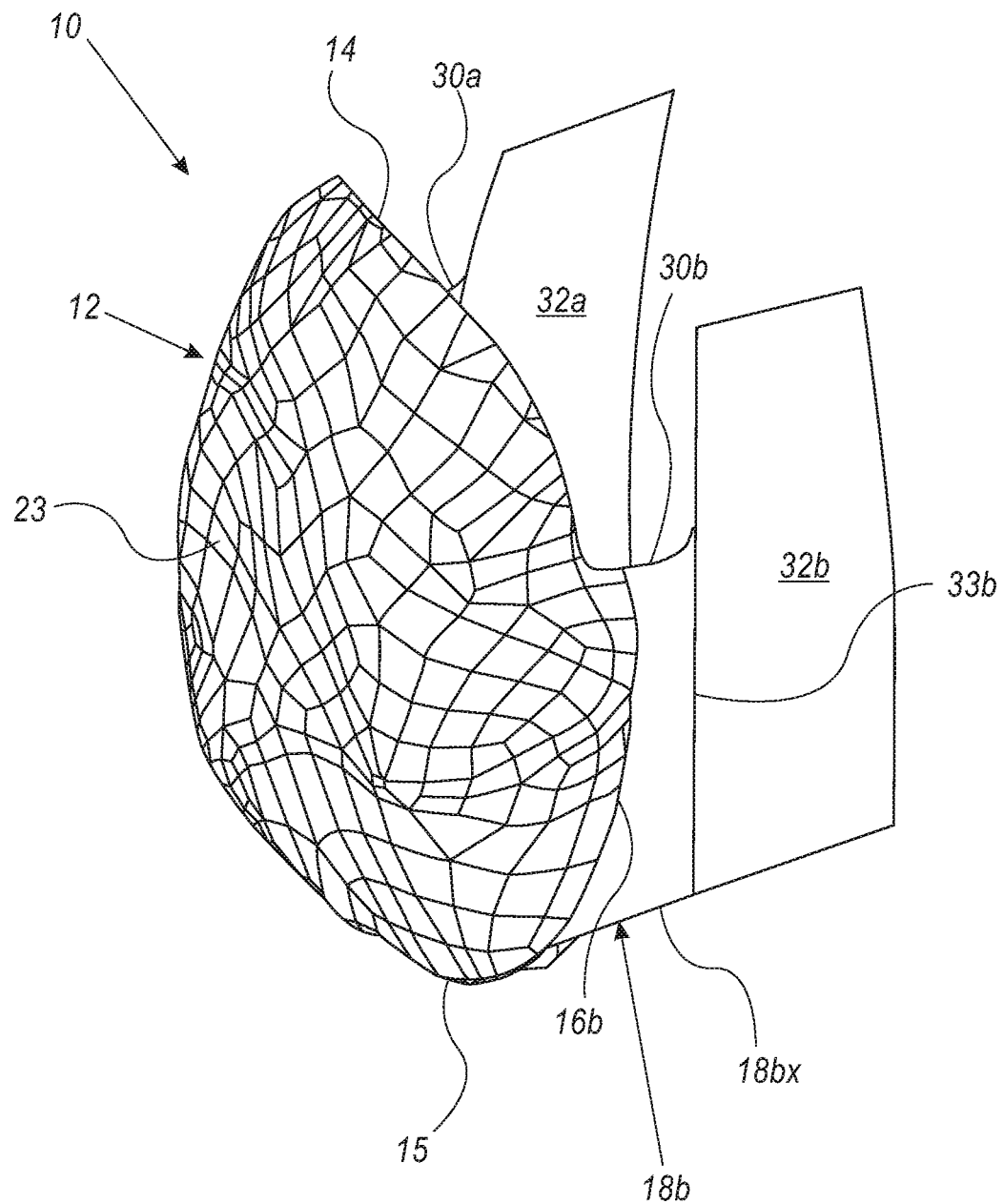

Throughout this document, references to directions and orientations, such as inward, outward, upper, lower, front, rear, top, bottom, lateral, and derivatives thereof, and the like. The references to these directions and orientations are exemplary, for describing and explaining the present invention, and embodiments thereof, and are not limiting in any way.

FIGS. 1A, 1B, 2A, 2B and 3 show a matrix 10 for being fitted over a tooth. The matrix 10, is, for example, a unitary member, for being placed over, and typically onto, a tooth, in order that, for example, a flowable and curable material can be injected into the matrix 10 to create a veneer on the tooth. The matrix 10 is such that it is positioned on the tooth in accordance with the desired thickness of the veneer. Once the injected material is cured, the matrix 10 is removed from the tooth. With the matrix 10 removed from the tooth, the resultant veneer is now integral with the tooth. The tooth may then be subjected to other procedures, such as resurfacing, grinding, polishing, and the like.

The matrix 10 includes a facial portion 12 which is of a contoured shape to conform with the shape of the outer surface of the tooth. The facial portion 12 extends longitudinally between a gingival edge 14, which is designed to be flush with the tooth at the gum line, approximately 1 mm underneath the gum line, and a chewing surface edge 15, and laterally, between lateral edges 16a, 16b. The gingival edge 14, chewing surface edge 15 and lateral edges 16a, 16b define a periphery for the facial portion 12. A chewing surface cap 17 extends along the chewing surface edge 15, between lateral sides 17a, 17b. The lateral sides 17a, 17b are flush and typically coplanar with oppositely disposed tabs 18a, 18b. The tabs 18a, 18b extend from the lateral edges 16a, 16b of the facial portion 12.

Figure 2A:
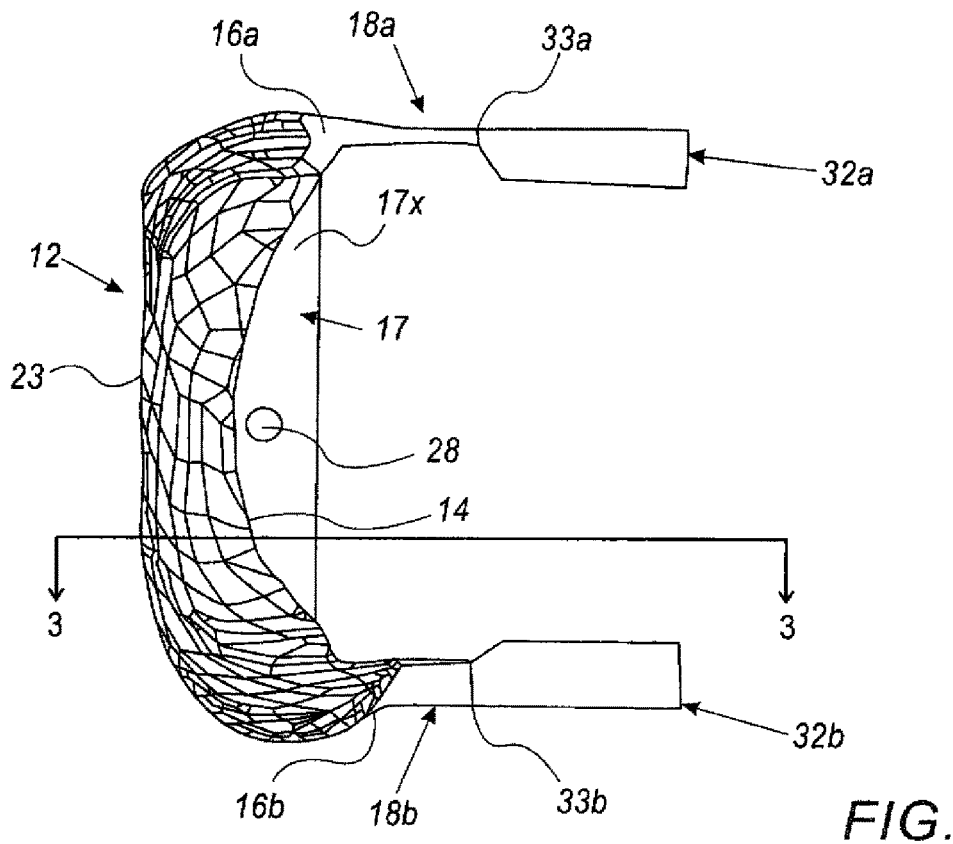
FIG. 2A is a bottom view of the matrix of FIGS. 1A and 1B.
Figure 2B:
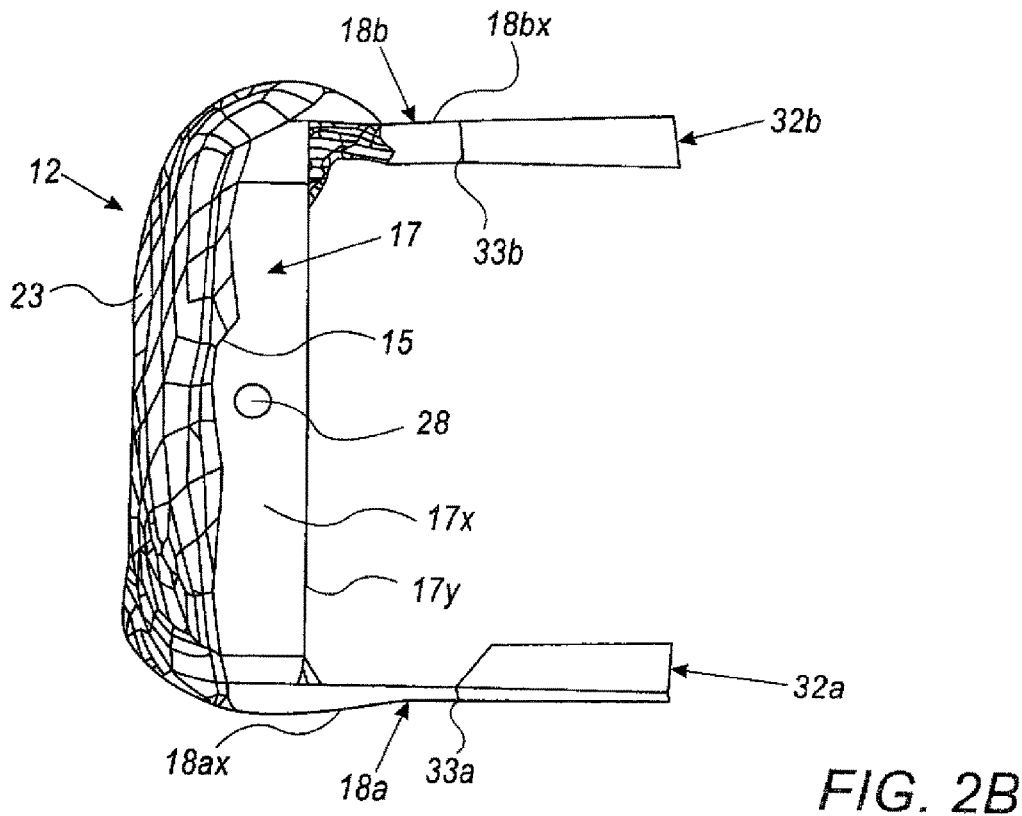
FIG. 2B is a top view of the matrix of FIGS. 1A and 1B.
Figure 3:
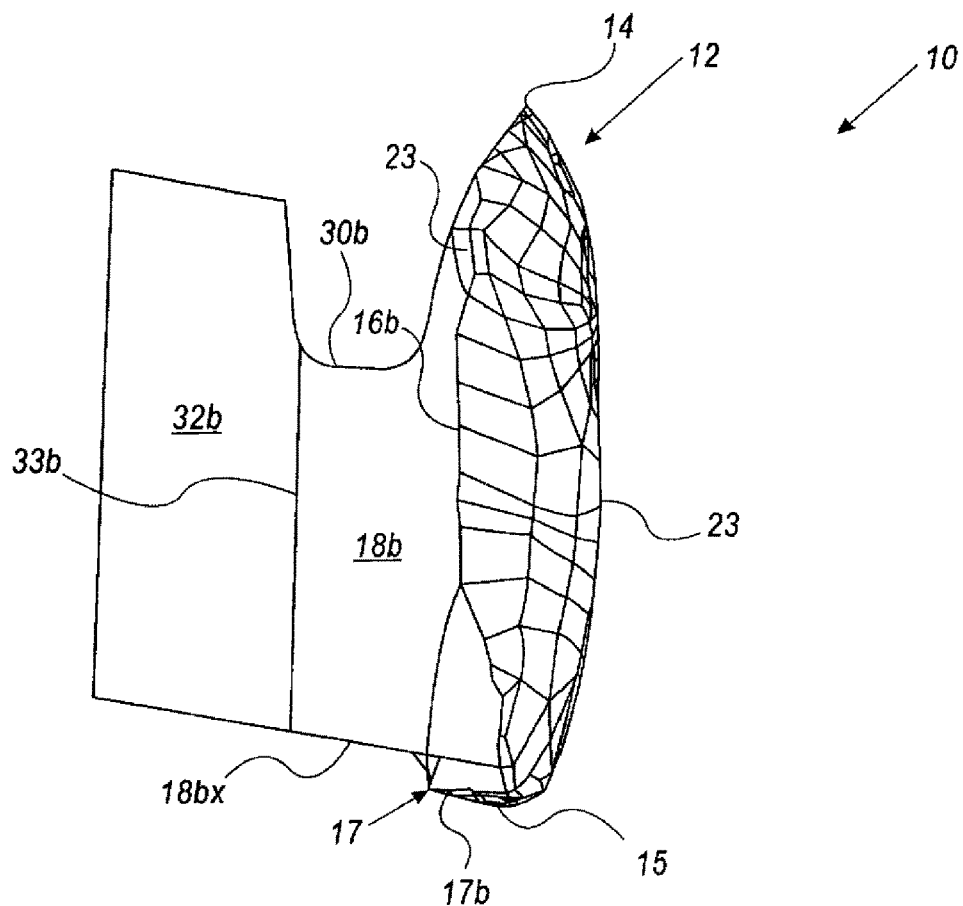
FIG. 3 is a cross sectional view of the matrix of FIGS. 1A and 1B taken along line 3-3 of FIG. 2A.

The facial portion 12 includes an outer buccal surface 23, and an inner dental surface 25. The inner dental surface 25 is, for example, shaped and textured, for example, in a nonuniform manner, to provide (e.g., replicate) the texture of the natural tooth type which it is designed to restore, and may also include perikymata and mamelonn. The facial portion 12 is, for example, contoured (e.g., curved) (FIGS. 1A and 1B), and slightly asymmetrical, as shown in FIGS. 2A and 2B, in order to accommodate the shape of the tooth, for example, for a left palatal incisor as shown in the drawing figures.

A gingival edge 14 is designed to be flush with the gum line. For example, the matrix 10 is designed to be inserted to cover the tooth such that the gingival edge 14 sits approximately 1 mm from the gum line.

A chewing surface cap 17 includes a platform 17x and an inwardly curved lip 17y, which extends inward from the platform 17x. The lateral sides 17a, 17b of the chewing surface cap 17 join to the lateral edges 16a, 16b as well as the tabs 18a, 18b along the tab edges 18ax, 18bx. The chewing surface cap 17, for example, at the platform 17x, includes an aperture 28, through which a flowable material is injected. The aperture 28 is circular in shape, but other shapes, such as square, rectangular, oval, triangular, combinations thereof, and the like, are also suitable, provided they accommodate a syringe, needle or other injection structure. While a single central aperture 28 is shown, multiple apertures at multiple positions on the chewing cap 17 are also permissible.

Laterally disposed tabs 18a, 18b, extend from the respective lateral edges 16a, 16b of the facial portion 12, and a portion thereof is typically attached to the chewing surface cap 17, at each lateral side 17a, 17b. The tabs 18a, 18b are such that they define an interproximal surface between adjacent teeth, creating a frictional engagement in the space between the teeth, in order to support the matrix 10 when it is engaged on the requisite tooth.

Each of the tabs 18a, 18b includes a cut-out portion 30a, 30b, to receive and fit the gums, allowing the matrix 10 to sit over the tooth. The cut-out portions 30a, 30b are dimensioned to sit underneath or over the gums, and to allow the matrix 10 to be pivoted, moving the matrix 10 forward and rearward (when the tabs 18a, 18b are pushed or pulled causing the pivoting), as desired by the professional, in order to control the thickness of the material which will be inserted into the matrix 10, and therefore, controlling the thickness of the veneer on the tooth, as detailed below. The tabs 18a, 18b are such that they confine composite material to the matrix 10, preventing it from leaving the matrix 10 and entering into the oral cavity and/or contacting other teeth, such as teeth adjacent to the tooth being treated. The tabs 18a, 18b are flexible, e.g., of a flexible material, so that they can be folded or otherwise bent inward during operation of the matrix 10 (detailed below), keeping flowable composite (for example, and curable) material from getting outside of the matrix 10, as well as preventing saliva, blood and other body fluids from entering the area (e.g., including the cavity 54) covered (encased) by the matrix 10, keeping the process clean. Additionally, the inwardly bent tabs 18a, 18b serve as a wall which is used to build missing portions of teeth (by filling with flowable composite, and, for example, curable, material, as detailed below), by forming a palatal shell or wall, for upper teeth, and a lingual shell or wall for lower teeth.

Wings 32a, 32b, also of a flexible material, e.g., the same material as the tabs 18a, 18b, and integral with each of the respective tabs 18a, 18b, extend from the respective tabs 18a, 18b, and are foldable or otherwise bendable from the tabs at or about the respective fold lines 33a, 33b (weakened portions which allow for bending and/or folding). The folded wings 32a, 32b are typically folded about the respective fold lines 33a, 33b so as to be aligned with each other (for example, in an orientation perpendicular now inwardly bent tabs 18a, 18b), creating a gripping portion 56 (FIGS. 6A and 6B), which the professional grips with fingers or instruments and moves the matrix 10, to adjust the cavity 54 (FIG. 4) (space) between the tooth and the facial portion 12, for the veneer.

The matrix 10, for example, is a unitary member, shaped for a particular tooth, such as an incisor, for example, the matrix 10 and other matrices disclosed herein may be shaped and dimensioned for all teeth, for example, such as a left palatal (upper) incisor as shown in FIGS. 4-9, or other teeth including pre-molars, molars and canine, both palatal and lingual (lower). The matrix 10, at least the facial portion 12, is made of a light transmissive material, such as a translucent or transparent material, to allow the passage of light through to the matrix 10, the light, such as ultraviolet (UV) light, for curing the flowable composite material, which was previously injected into the matrix 10, as detailed below. The translucent or transparent material includes thermoplastic materials, such as medical grade acrylic, polypropylene, polyethylene, ABS, nylon, siliconized rubber, which are biocompatible, inert and non-toxic. Alternately, the chewing surface cap 17 and tabs 18a, 18b may also be made from medical grade nylon, polyvinyl chloride (PVC), polyethylene or polypropylene.

All of the materials of the matrix 10 are, for example, of an approximately uniform thickness, of approximately 0.025 mm to 0.5 mm. The matrix 10 is typically disposable, but may also be for multiple uses.

Figure 4:
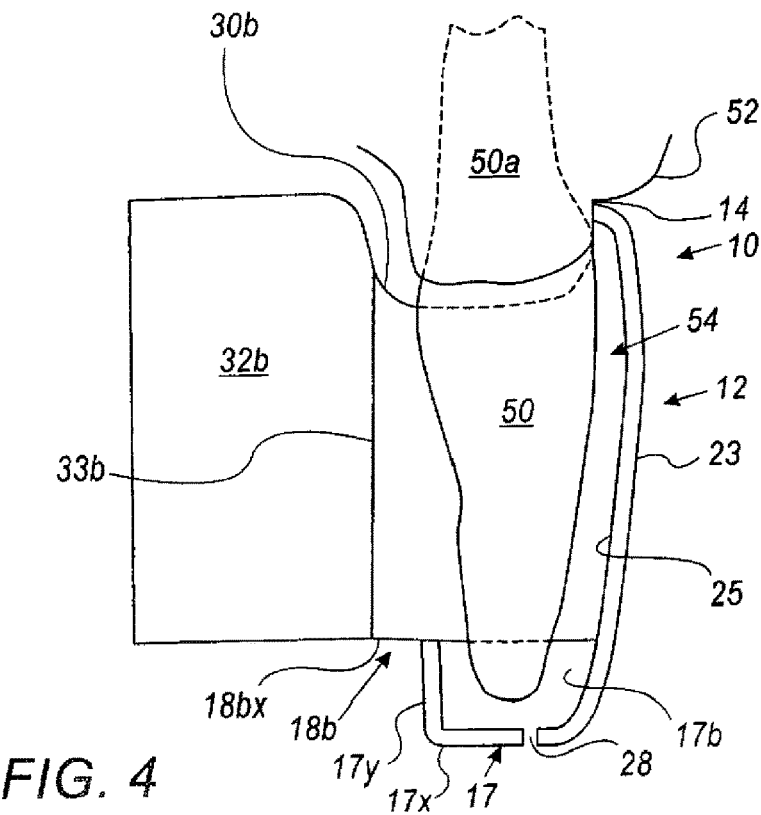
FIG. 4 is a cross sectional view of a tooth with the matrix placed over it when creating the veneer on the tooth in accordance with embodiments of the invention.

Attention is now directed additionally to FIGS. 4-9, where the matrix 10 is shown in operation for creating a veneer on a tooth 50. Initially, as shown in FIG. 4, the matrix 10 is placed over the tooth 50 (with the tooth root 50a extending into the gum). This placement is such that the facial portion 12 at the gingival edge 14 is in contact with and flush with the tooth 50 just below the gum line 52, e.g., approximately 1 mm, such that the cavity 54 is closed from the rest of the mouth, and that the finish line of the veneer 66 (FIG. 9) is just underneath the gum line 52. Additionally, the tabs 18a, 18b occupy the space between the tooth 50 and each adjacent tooth, creating a frictional engagement, to hold the matrix 10 in its proper position on the tooth 50. The cut-out portions 30a, 30b are such that they allow the matrix 10 to pivot about the gum, to be properly positioned over the tooth 50. This allows for adjustment of the thickness of the veneer 66 (FIG. 9) for the tooth 50, by the pushing or pulling of the tabs 18a, 18b, moving the facial portion 12 of the matrix 10 with respect to the tooth 50 (adjusting the dimensions of the cavity 54 between the facial portion 12 and the tooth 50). The cavity 54 is of a desired thickness for the veneer 66 (FIG. 9) between the facial portion 12 and the tooth 50.

The cut-out portions 30a, 30b, for example, are designed such that along with parts of the facial portion 12 contact the tooth 50 interproximally between the tooth 50 and each adjacent tooth, so as to close the matrix 10 (and its cavity 54, such that the matrix 10 encases the tooth 50). For example, the cut out portions 30a, 30b are also designed to sit below the gum line 52, approximately 1 mm below the gum line 52 (where the cut out portions 30a, 30b contact the tooth 50).

Figure 5:
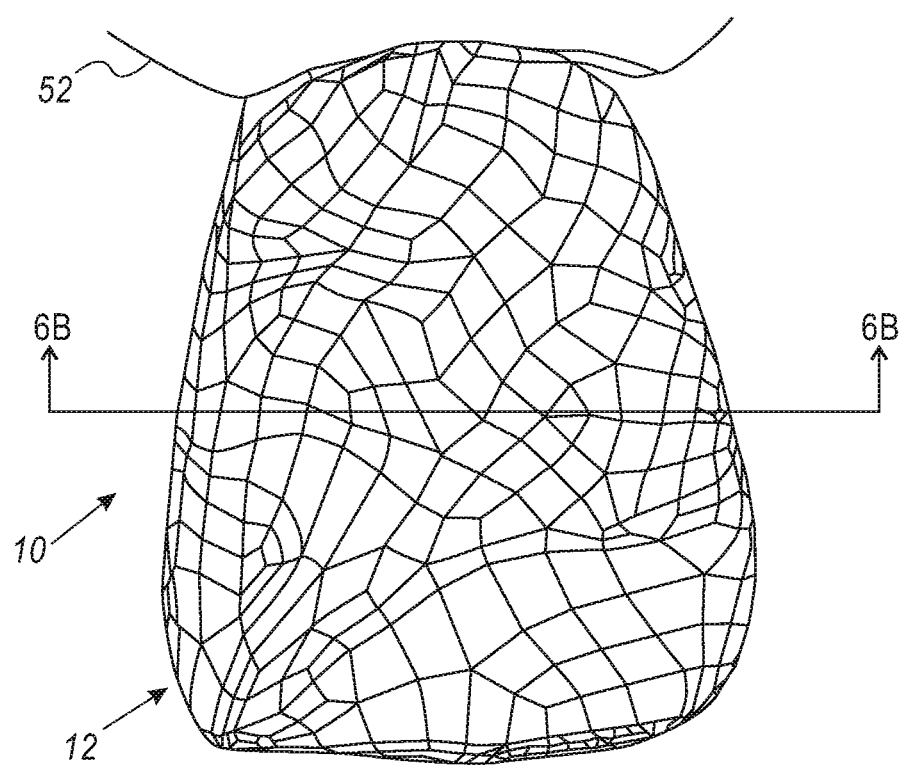
FIG. 5 is a perspective view showing the tooth as covered by the matrix when creating the veneer on the tooth in accordance with embodiments of the invention.
Figure 6A:
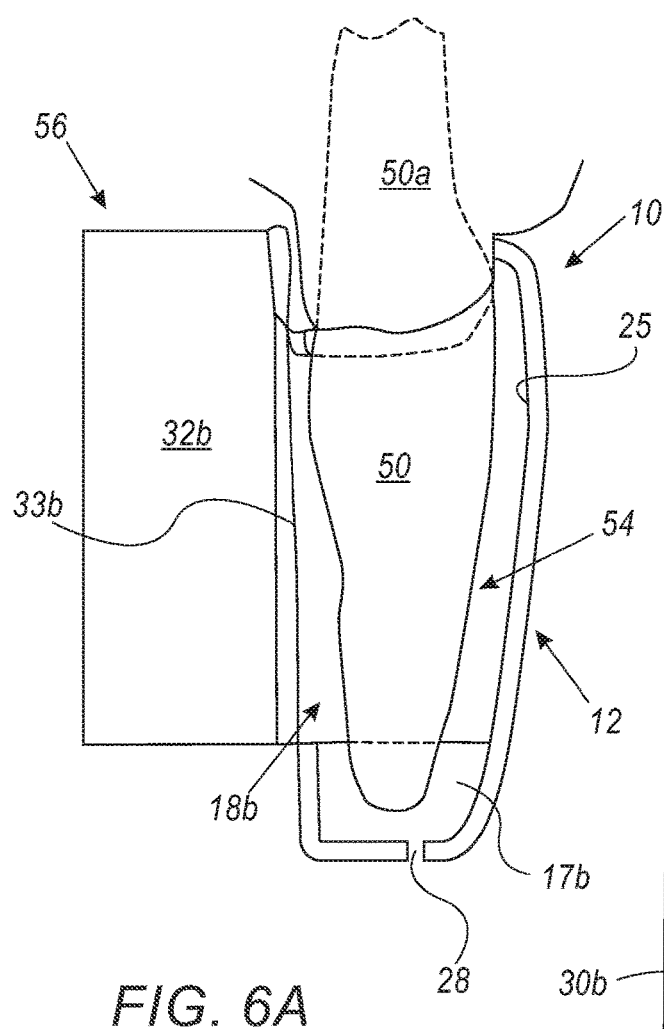
FIG. 6A is a cross sectional view of the tooth as covered by the matrix in accordance with FIG. 5.
Figure 6B:
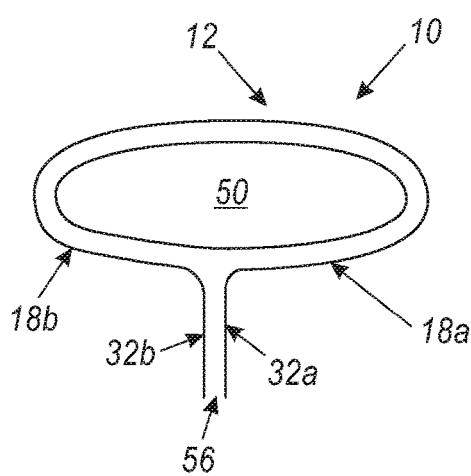
FIG. 6B is a cross sectional view of the tooth as covered by the matrix taken along line 6B-6B of FIG. 5.

In FIG. 5, the tooth 50 is covered by the matrix 10, as the tabs 18a, 18b are bent or folded inward, and the wings 32a, 32b are folded along fold lines 33a, 33b, to at least approximately perpendicular to the respective tabs 18a, 18b, so as to form a gripping portion 56, as shown in FIGS. 6A and 6B. This gripping portion 56 is gripped by the professional, by fingertips or instruments and manipulates the matrix 10, to pivot about the gum, resulting in the cavity 54 being adjusted to the desired thickness for the veneer. Optionally, the overlapping wings 32a, 32b may be secured together with an adhesive, or by mechanical fasteners, or combinations thereof. The matrix 10 now encases the tooth 50.

Figure 7:
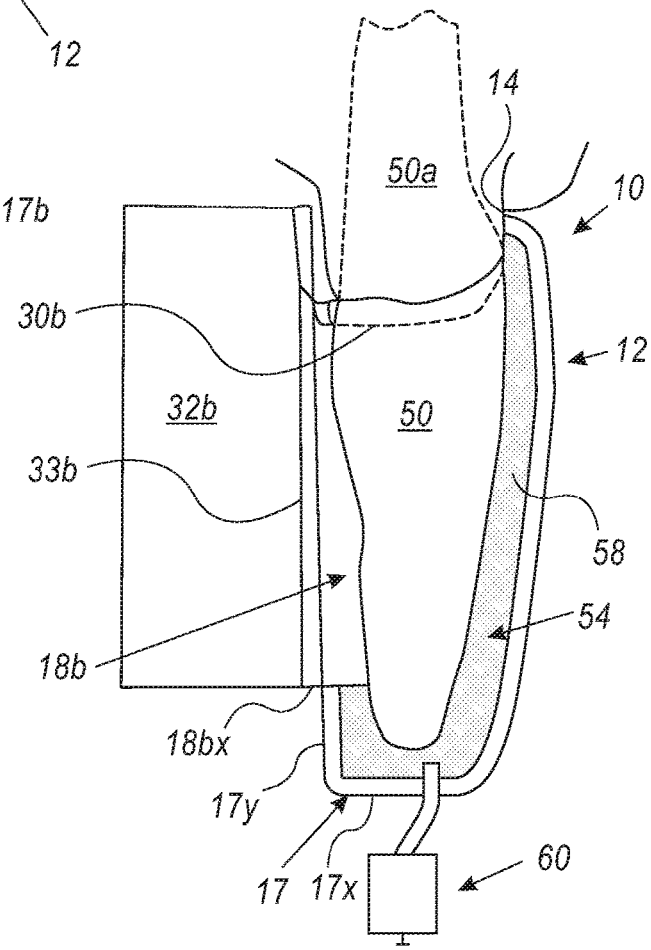
FIGS. 7 and 8 are cross sectional views of FIG. 6A showing the veneer forming process in accordance with embodiments of the invention.

With the thickness of the veneer set, based on the cavity 54 set (adjusted) between the facial portion 12 of the matrix 10 and the tooth 50, flowable and restorative material, such as a UV light curable composite (material) 58 is injected, by a syringe 60 through the aperture 28 in the chewing surface cap 17, into the cavity 54, as shown in FIG. 7. The injection by the syringe 60 is under pressure (of the syringe plunger), and fills the cavity 54, which is a closed space, in a manner which eliminates air bubbles and air gaps in the injected composite material in the cavity 54. As a result of all air bubbles and air gaps being eliminated, oxygen cannot reach the dental composite and a nonoxygen inhibited layer is formed in the cavity 54, allowing for all layers of the composite to be well cured, as detailed below. Because the cavity 54 is closed (i.e., as edges of the matrix 10 contact the tooth 50, as the matrix 10 encloses the tooth 50), there is no contamination of the composite material from blood, saliva, body fluids, other contaminants and the like. The injection is complete when composite material exits the matrix 10 through the aperture 28.

Example composites include, ESPE 6020A3 Filtek® Z250 Universal Restorative Refill, from 3M, St. Paul, Minn., and Herculite™. Ultra Flow Nanohybrid Flowable Composite from Kerr. An example syringe which may be used is a 1-4 g Syringe.

Figure 8:
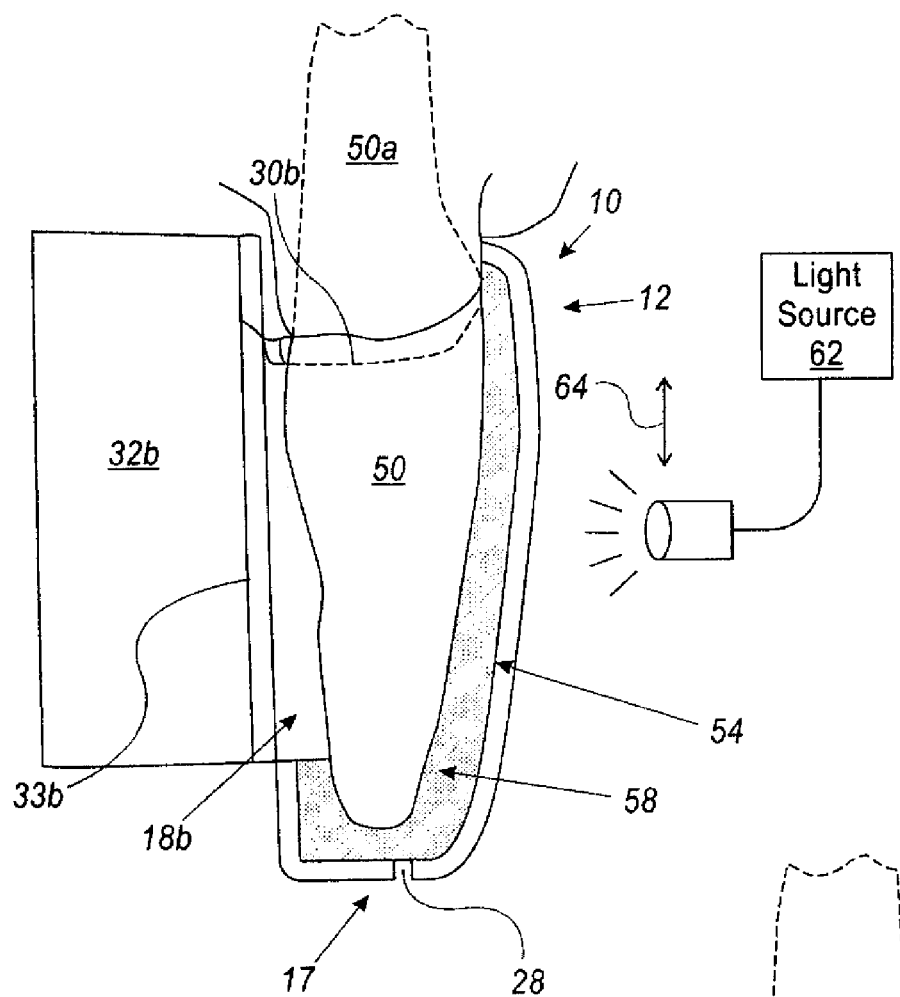

Turning to FIG. 8, the syringe 60 is now removed, and the cavity 54 is full with the composite 58. Curing of the composite 58 with UV light, from an instrument 61 which emits UV light from a UV light source 62 is applied to the matrix 10 at the facial portion 12. The UV light instrument may be moved for localized curing on the tooth 50, the movement represented by the double headed arrow 64. The translucency or transparency of the facial portion 12 allows the UV light to cure the composite material 58, to form the veneer 66 (FIG. 9) on the tooth 50, the veneer being integral with the tooth 50 due to the curing.

Figure 9:
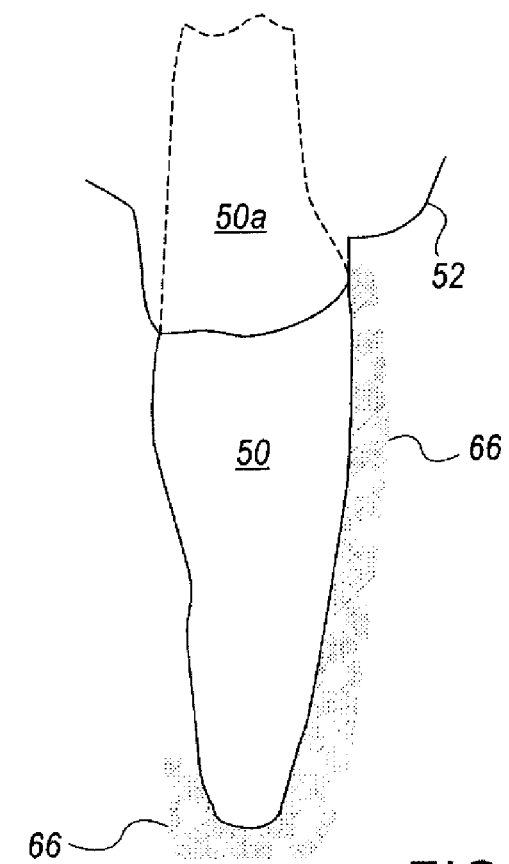
FIG. 9 shows the veneer, as formed on the tooth in accordance with the veneer forming process in accordance with embodiments of the invention.

Once the composite 58 has cured, the matrix 10 is removed. The veneer 66 is now on the tooth 50, as shown in FIG. 9. Optionally, the now-formed veneer 66, which is integral with the tooth 50 may be resurfaced or otherwise treated, by the professional.

Figure 10A:
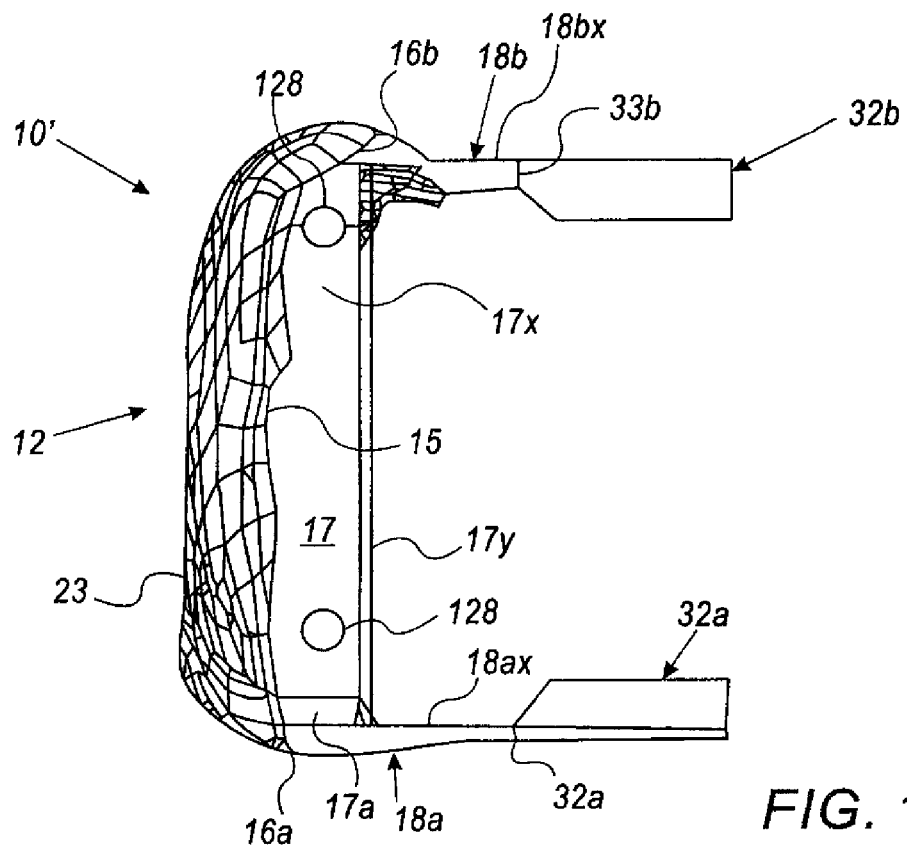
FIG. 10A is a bottom view of an alternate embodiment matrix in accordance with the present invention.
Figure 10B:
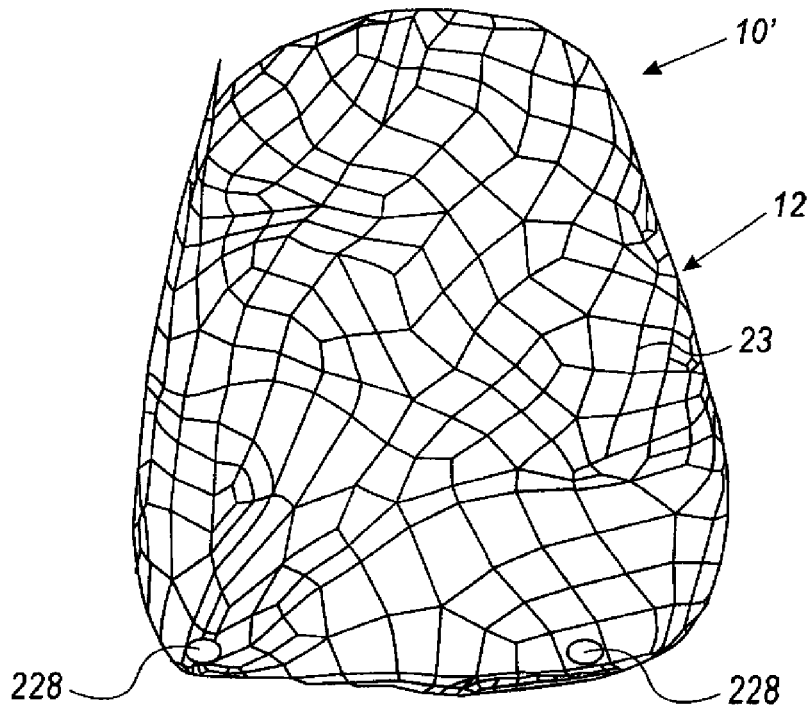
FIG. 10B is a perspective view of the alternate embodiment matrix of FIG. 10A covering a tooth.

FIGS. 10A and 10B show an alternative matrix 10', which is similar to that of the matrix 10 detailed above, and elements are numbered similarly, except that the chewing cap 17, at its platform 17x has two apertures 128. Through these two apertures 128, similar to the aperture 28 of the matrix 10, detailed above, flowable materials may be injected into the cavity 54 between the facial portion and the tooth, to create the veneer, when the matrix 10', is over a tooth, as shown for example in FIG. 10B.

Figure 11:
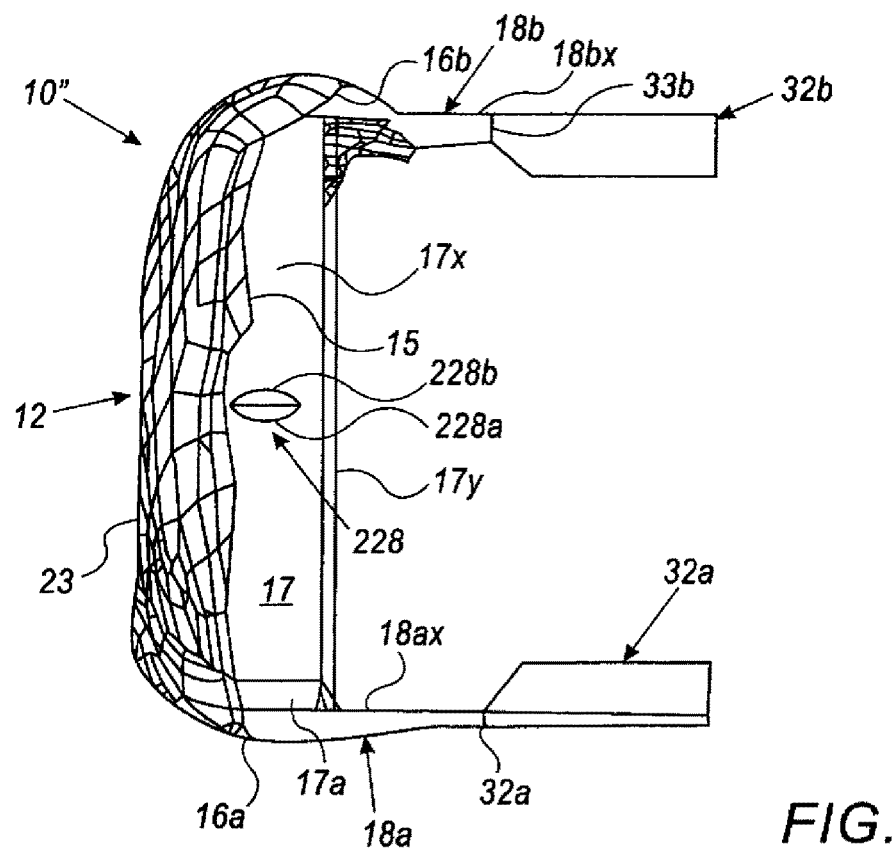
FIG. 11 is a bottom view of an another alternate embodiment matrix in accordance with the present invention.

FIG. 11 shows an alternative matrix 10", which is similar to that of the matrix 10 detailed above, and elements are numbered similarly, except that the chewing cap 17, at its platform 17x an aperture 228, formed of dual apertures 228a, 228b, for example, which are semicircular in shape. Through these two apertures 228a, 228b, flowable materials may be injected into the cavity 54 between the facial portion 12 and the tooth, to create the veneer, when the matrix 10", is over a tooth.

Figure 12:
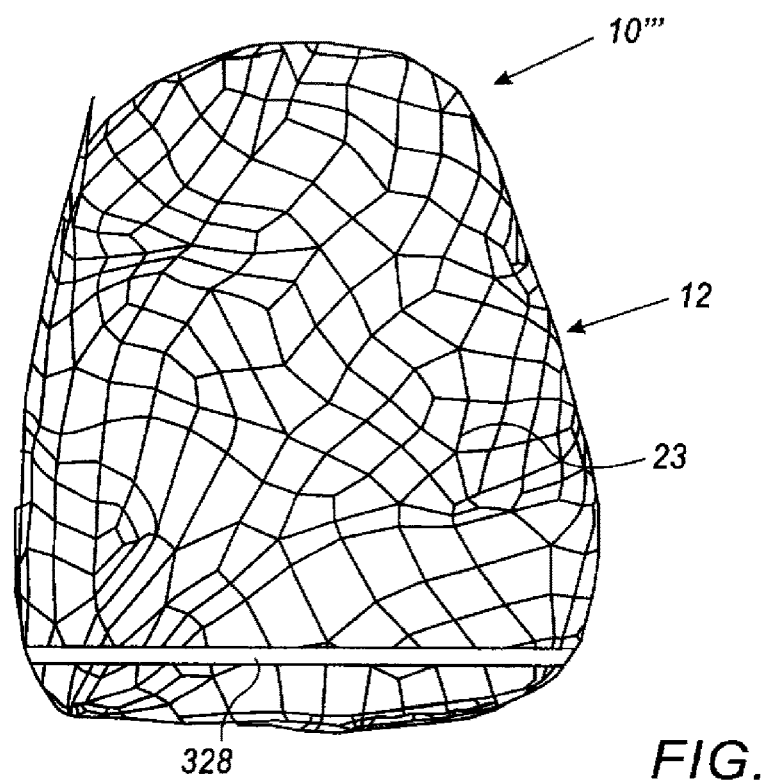
FIG. 12 is a perspective view of another alternate embodiment matrix in accordance with the present invention covering a tooth.

FIG. 12 shows an alternative matrix 10''' over a tooth. The matrix 10''' is similar to that of the matrix 10 detailed above, and elements are numbered similarly, except that the chewing cap 17, at its platform 17x, a slot 328 has replaced the aperture 28. Through this slot 328, flowable materials may be injected into the cavity 54 between the facial portion 12 and the tooth, to create the veneer, when the matrix 10''', is over a tooth.

FIGS. 13-17C show another dental matrix 400, which includes an outwardly extending column, which is engaged by an instrument, allowing the dentist to move the instrument and maneuver the matrix into position on the operative tooth to create a cavity for the veneer. The cavity is filled with curable material, which is cured by light, such as ultraviolet light, and once curing is complete, the matrix is removed from the tooth, which now has the veneer formed thereon.

Figure 13:
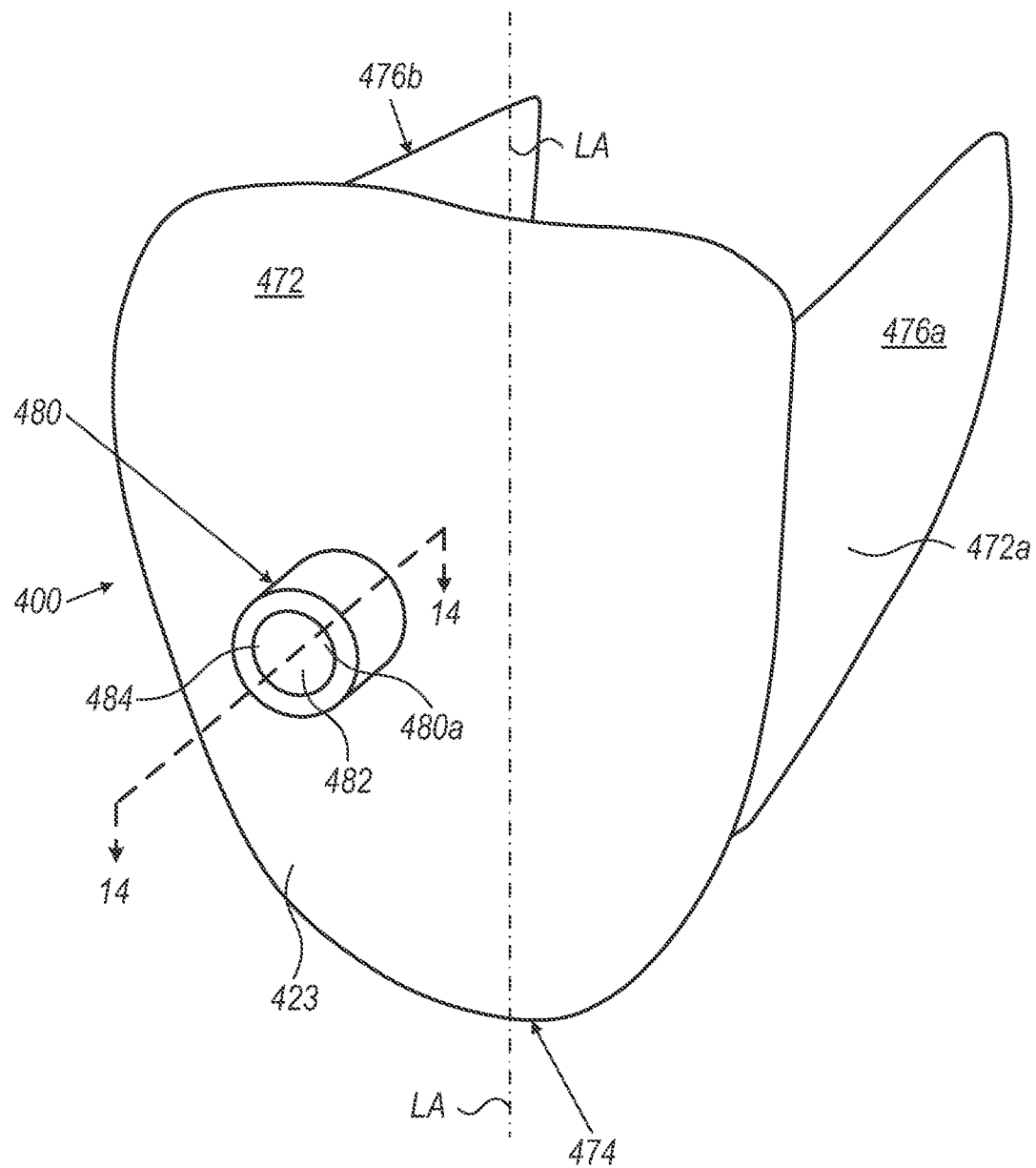
FIG. 13 is a perspective view of a matrix in accordance with another embodiment of the present invention.

FIG. 13 shows another embodiment of a matrix 400. The matrix 400 is operationally similar and made of materials (including the light transmissive materials) the same or similar, to that or those of matrix 10, 10', 10" and 10''', with similar structures to those discussed above being numbered correspondingly in the 400s. The matrix (body) 400 includes a facial portion 472, which is of a contoured shape, to conform with the shape of the outer (buccal) surface of the tooth 499 (FIG. 15) (also referred to in some instances below as the "operative tooth", as a disclosed procedure using the matrix 400 is performed on the tooth 499), which includes a chewing surface cap 474 at one (outer) end 472x of the facial portion 472 (opposite the gum-facing end 472y), to cover the chewing surface of the tooth. Flanges 476a, 476b extend from opposite lateral edges 472a, 472b of the facial portion 472.

The matrix 400 includes a column 480, also known as a stalk, extending from the buccal side 423 of the facial portion 472, and represented by a dimension YY, which is, for example, approximately 1.5 mm. A channel or bore 482 extends through the column 480, with an aperture or opening 484 (outer or end opening) at an outer end 480a of the column 480, and an aperture or opening 486 at the inner end 480b of the column 480. The opening 486 is in communication with and opens into the cavity 488 of the matrix 400 (the cavity 488 formed by the concavity of the facial portion 472 of the matrix 400), allowing material to be introduced into the channel 482 and through the opening 486, into the cavity 488, to fill the cavity 54 between the matrix 400 and the tooth 499 (FIG. 17C), as detailed above, to perform the procedures in forming, shaping and curing the veneer on the tooth, by the matrix 400, which is detailed further below.

Figure 14:
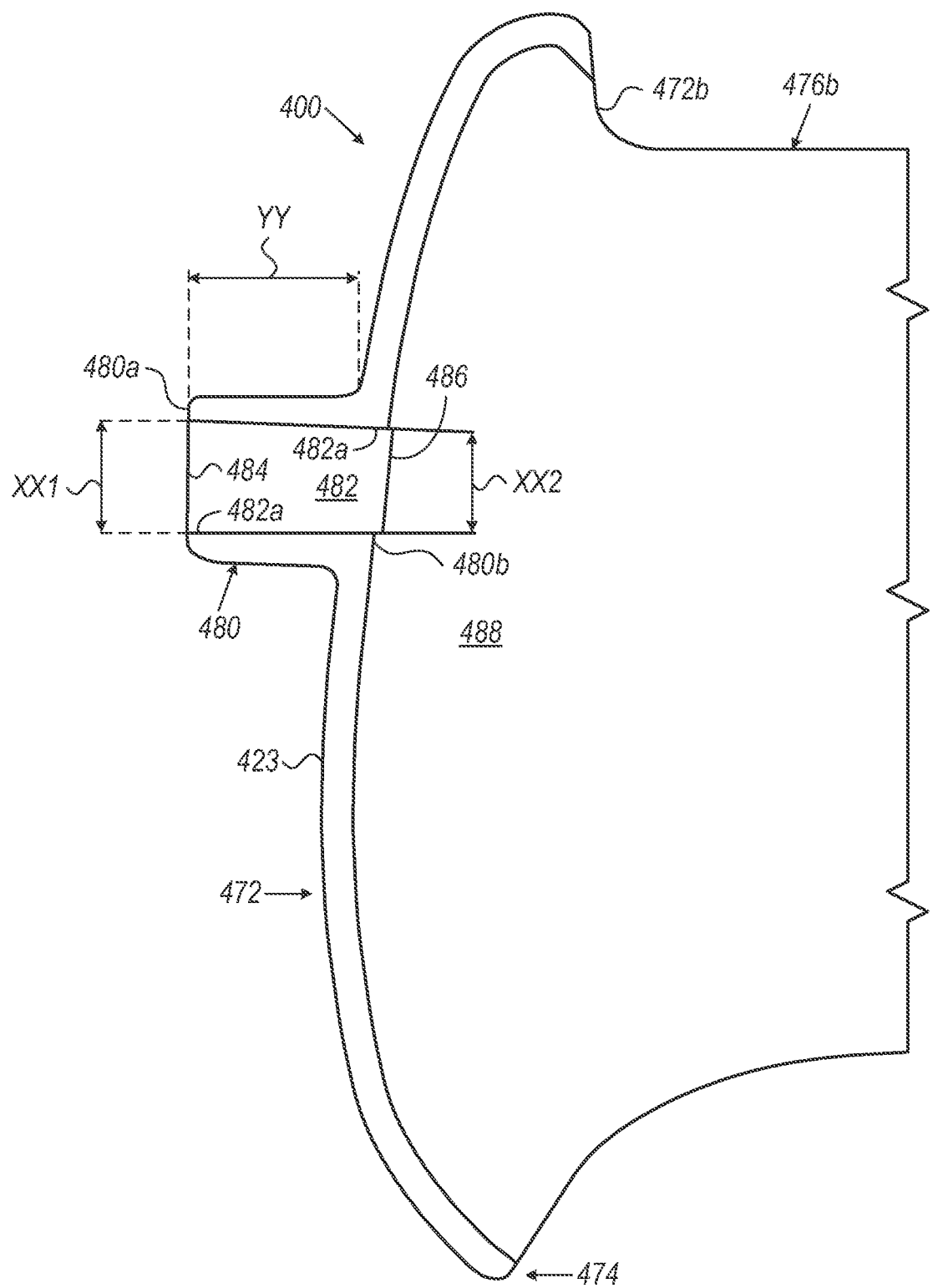
FIG. 14 is a cross-sectional view of the matrix of FIG. 13 taken along line 14-14; and, FIG. 15 is diagram showing the matrix of FIG. 13 being moved into contact with a tooth.
Figure 15:
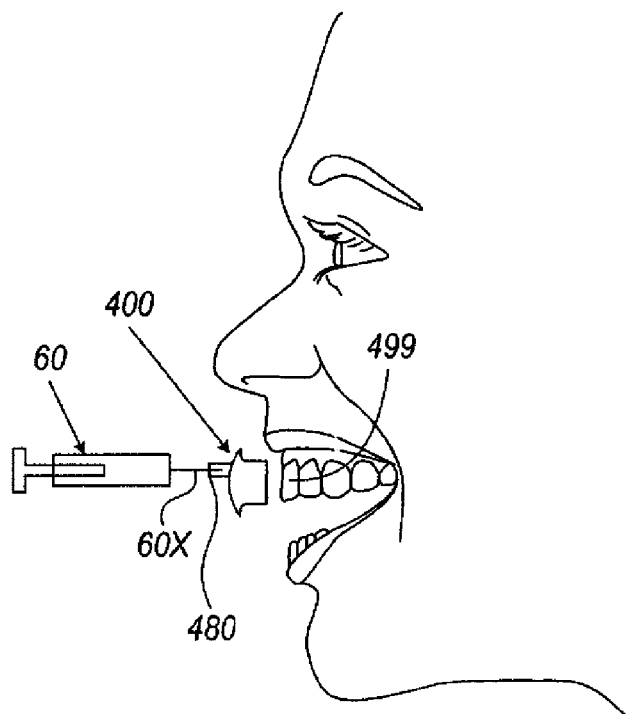

As shown in FIG. 14, the channel 482 is, for example, tapered inward (walls 482a of the channel 482) from the outer opening 484, represented by a dimension XX1, to the inner opening 486, represented by a dimension XX2. For example, dimension XX1 (which is, for example, approximately 1.0 mm) is greater than dimension XX2 (which is, for example, approximately 0.8 mm), to achieve the inward tapering of the channel 482. This tapering allows for receipt of a tube 60x of an instrument 60, by a frictional engagement of the tube 60x in the channel 482 of the column 480, as shown in FIG. 15 and detailed below. The channel 482 is typically of the same cross sectional shape as the openings 484, 486, e.g., rounded, circular, or oval, so as to be of a shape corresponding to the cross-sectional shape of the tube 60x, in order to receive and frictionally engage the tube 60x. However, the channel 482 and openings 484, 486, may be other suitable shapes, provided that the channel 482 and outer opening 484 can receive and engage the tube 60x in a suitable manner. The column 480 extends a length sufficient to support and engage the tube 60x, as shown in FIG. 15 and discussed below.

The column 480 is positioned on the buccal side 423 of the facial portion 472. For example, the column 480 is located (positioned) at or approximately at, a location on the buccal side 423, which may be the volumetric center or flow center for the matrix 400. In this volumetric center location (position), material can evenly fill (and evenly flow and spread in) the cavity 54 between the matrix 400 and the tooth 499 (FIG. 17C). For example, by evenly filling the cavity 54, the cavity 54 is filled densely, so as to be free or substantially free of air bubbles, air pockets, and the like, which provides maximum contact area of material to the tooth 499. The resultant veneer (upon the material being cured, for example, by UV light as detailed above) bonds strong to the tooth (e.g., maximum contact area for the veneer material, due to maximum amount of material injected into the cavity between the matrix 400 and the tooth), and is of maximum strength. Alternately, the column 480 may be placed at other locations on the facial portion 472, including, for example, centrally or substantially centrally, based on length/distance measurements, or the like.

The material of the facial portion 472 and the column 480 are such that they are of a rigidity so as not to bend inward, buckle, or the like, and retain their original (initial) shape, regardless of any pressure changes in the matrix 400 caused by the filling of material into the cavity 54 through the column 480.

Flanges 476a, 476b, which extend from lateral edges 472a, 472b (rearward, with respect to the buccal surface 423) of the facial portion 472, are, for example, shaped differently, than the respective tabs 18a, 18b/wings 32a, 32b of the matrices 10, 10', 10", 10''', detailed above, but include similar structures, tabs 503 (similar to tabs 18a, 18b) and wings 505 (similar to wings 32a, 32b), as shown for example, in FIG. 16, detailed below. The tabs 503 may, for example, include cut-out portions similar to those 30a, 30b (or portions and/or segments thereof) of the matrices 10, 10', 10", 10'''; in accordance with that detailed above, for maneuverability. The flanges 476a, 476b may, for example, be shorter, the same length, or longer than the tabs 18a, 18b/wings 32a, 32b of the matrices 10, 10', 10", 10''' detailed above, with just the tabs 503 need to enter the interproximal space between the adjacent teeth, to create frictional forces, to hold the matrix 400 in place. The forces which hold and otherwise the matrix 400 in place are such that the matrix 400, as the matrix 400 may be moved to be manipulated to shape and dimension the veneer. The movement (including maneuvering) for manipulation of the matrix 400 on the tooth 499 may be one or both of movement from the column 480, or by moving the flanges 476a, 476b. The frictional forces created by the flanges 476a, 476b between adjacent teeth also hold the matrix 400 in place during the filling of the cavity 54 with material, and during the curing processes (e.g., UV light curing, as detailed above), as detailed in FIG. 15 below. Similar to the tabs 18a, 18b/wings 32a, 32b of the matrices 10, 10', 10", 10''', one or both of the tabs 476a, 476b, for example, at the one or both wings 505, may be maneuvered, pulled, wrapped, or otherwise adjusted, to adjust the volume of the cavity 54 (including forming a portion of the tooth, by using the matrix 400 portions to form a wall, the wall compensating for a chip in the tooth or missing part of the tooth) for the material upon injection therein.

FIG. 15 shows an instrument, for example the syringe 60 (filled with curable material from which the veneer is formed, as detailed above), with a tube or tube portion 60x extending into the channel 482 of the cylinder 480 of the matrix 400. The instrument 60 is such that curable veneer forming material, as detailed above, is injected from the instrument 60 through the tube 60x to fill the cavity 54 of the matrix 400. The tube 60x frictionally engages the channel 482 (e.g., in a snug or frictionally snug manner), with frictional forces sufficient to maintain the matrix 400 in a fixed position on the tube 60x. The frictional forces are of sufficient strength, such that the matrix 400 remains in the fixed position as it is moved (for example, by one hand of an operator, such as a dentist or clinician) into contact with the tooth 499 and subsequently manipulated on the tooth 499, to establish the shape of the veneer.

The tube 60x remains engaged with the matrix during material injection from the instrument 60 into the cavity 54 between the matrix 400 and the tooth, and may be engaged with the matrix 400, or separated therefrom, during curing of the material in the cavity 54 to form the veneer, as detailed above. The frictional forces by the flanges 476a, 476b, for example, by the tabs 503 in the interproximal space between the tooth 499 and its adjacent tooth, on both sides, provide sufficient force to maintain the matrix 400 on the tooth 499 (e.g., in a snug manner) so as to hold the shape and dimensions of the veneer during shaping and/or curing of the material.

Once the procedure is complete, the matrix 400 is removed from the tooth 499. The matrix 400 may be removed with the instrument 60 attached, or by itself (the instrument 60 having been separated from matrix 400 previously).

Figure 16:
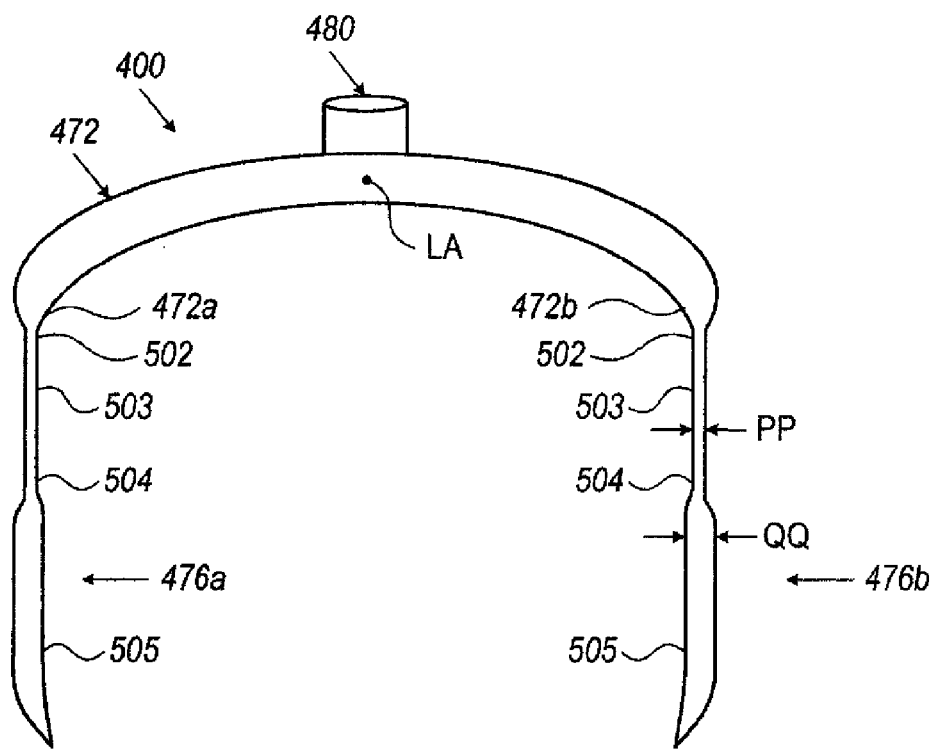
FIG. 16 is a top view if the matrix of FIG. 13.

FIG. 16 shows the matrix 400, including the flanges 476a, 476b, with separations, indentations, scores, or other demarcations 502, 504 in each flange 476a, 476b, between the buccal edges 472a, 472b and the tabs 503, separation 502, and between the tabs 503 and the wings 505, separation 504. The separations 502, 504 may, for example, be weakened portions, allowing for bending and moving of the tabs 503 (and wings 505) about the separations 502, and bending and moving of the wings 505 with respect to the tabs 503, about the separations 504. The flanges 476a, 476b, are, for example, symmetric, as, for example, is the facial portion 472 (along its longitudinal axis LA shown in FIGS. 13 and 16 (coming out of the paper)). The flanges 476a, 476b, are thin with tabs 503 of a dimension PP, for example, approximately 0.05 mm, and wings 505 of a dimension QQ, for example, of approximately 0.15 mm (also, for example, the facial portion 472 is of a thickness of approximately 0.2 mm). As a result of thinness of the flanges 476a, 476b, the matrix 400 is maneuverable into position for filling and curing in accordance with the example process shown in FIGS. 17A-17C. The tabs 503 and wings 505, are, for example, both of a uniform of substantially uniform thickness.

For example, due to their thinness, the tabs 503 are positionable at the interproximal surfaces between the operative tooth 499 and each of its adjacent teeth. The interproximal surface serves as a contact for engaging and maintaining the matrix 400 on the operative tooth 499, such that the matrix 400 remains engaged and held (e.g., in a snug yet moveable manner) while the matrix 400 is maneuvered on the tooth to define the shape of the veneer, and, for example, remains in this position on the tooth during the curing process, typically until the matrix 400 is removed from the tooth 499 with the now-formed veneer.

Figure 17A:
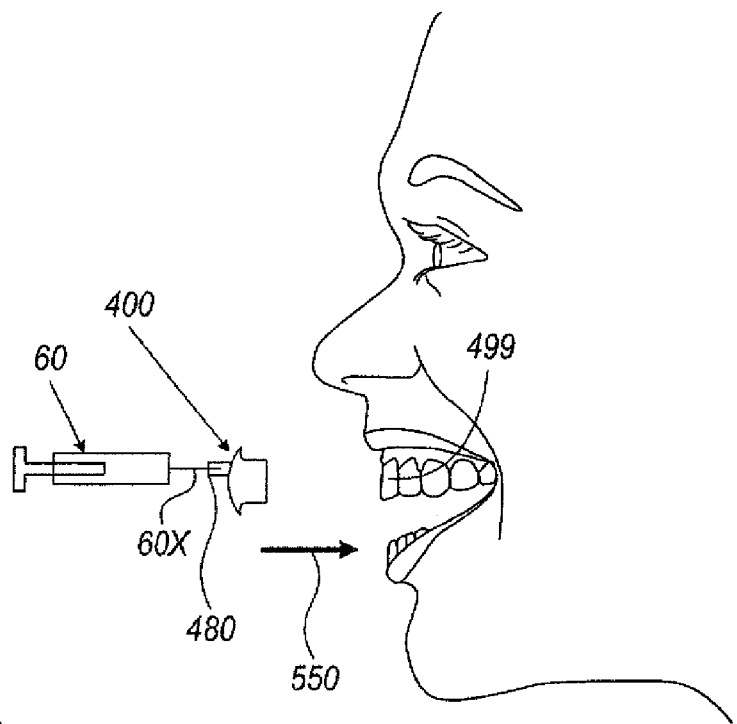
FIGS. 17A-17C are diagrams showing an example operation of the matrix of FIG. 13.

In FIG. 17A the matrix 400 is positioned and held in place, substantially free of or free of movement, on the tube 60x of the instrument 60, e.g., a syringe, filled with curable material to form the veneer, as detailed above. The instrument 60 with the matrix 400 is moved toward the tooth 499, in the direction of the arrow 550. The maneuvering and movement of the instrument is typically performed by a single hand of the dentist, clinician or operator.

Figure 17B:
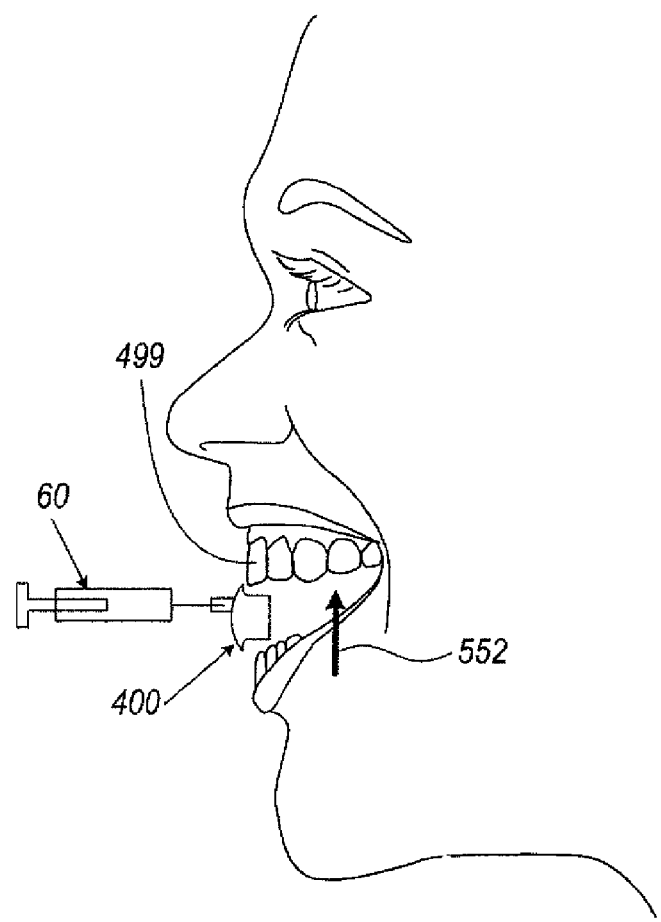
Figure 17C:
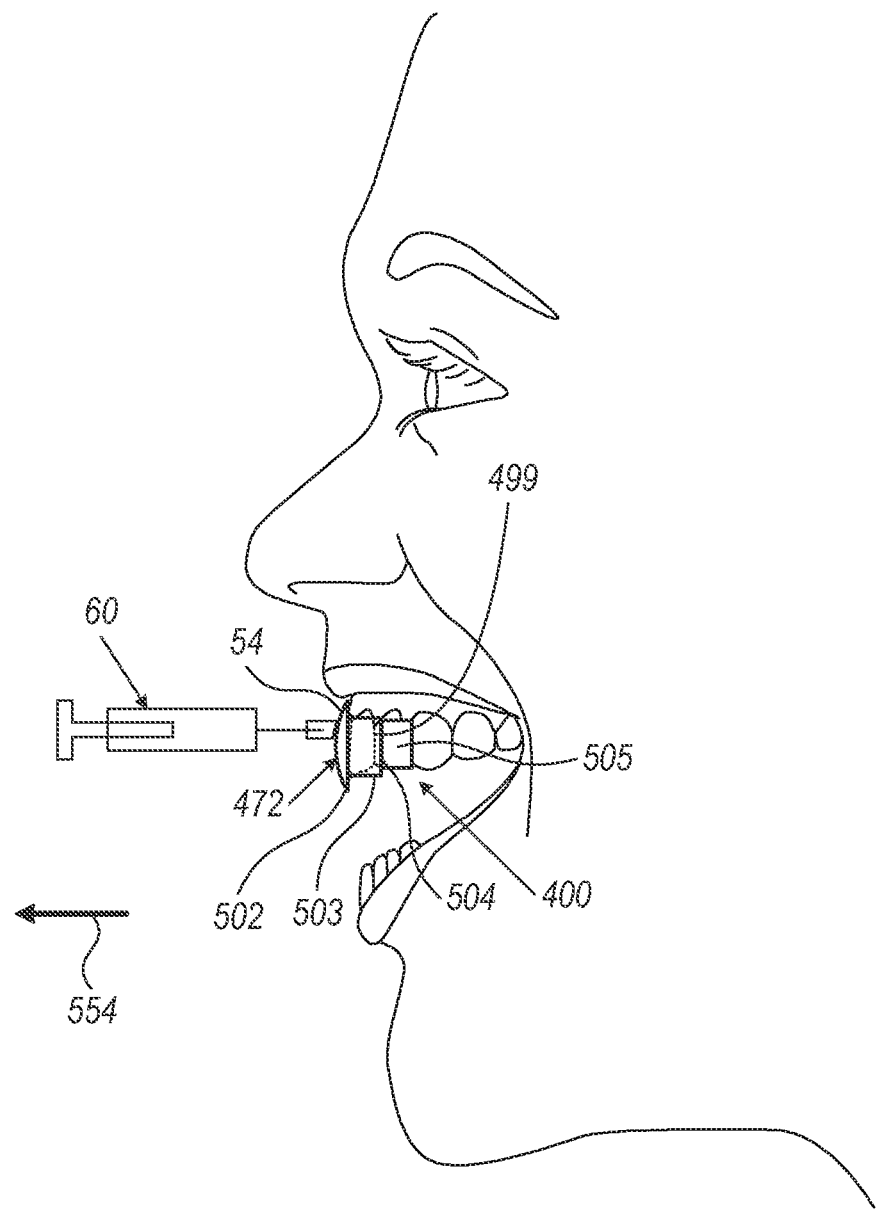

In FIG. 17B, the matrix 400, as held by the instrument 60, is under the tooth 499. The matrix 400 may now be moved upward, vertically or substantially vertically, in accordance with the arrow 552. The vertical movement allows the flanges 476a, 476b, for example, the tabs 503, to engage the matrix 400 between teeth (the operative tooth 499 and each adjacent tooth), at the interproximal surfaces thereof.

FIG. 17C shows the matrix 400 in position on the operative tooth 499, such that the matrix 400 can be manipulated to form the cavity (space) 54 for the veneer. With the cavity 54 defined (or otherwise set or established), curable material for the veneer is injected into the cavity 54, between the matrix 400 and the tooth (i.e., operative tooth 499). Once the cavity 54 is filled with curable material, the material is cured, for example, by light, such as UV light, as detailed above and as shown in FIGS. 8 and 9. With filling of the matrix 400 having been completed, or with the curing complete, the instrument 60 may be separated from the matrix 400, by moving the instrument 60 in the direction of the arrow 554. The matrix 400 may be removed from the tooth once curing is complete or at the discretion of the dentist.

Figure 18A:
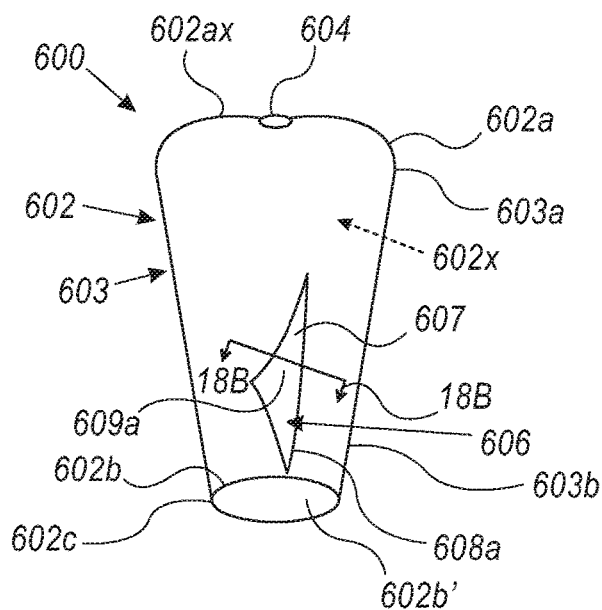
FIG. 18A is diagram of a rear view of the matrix of FIGS. 18A-8C.
Figure 18B:
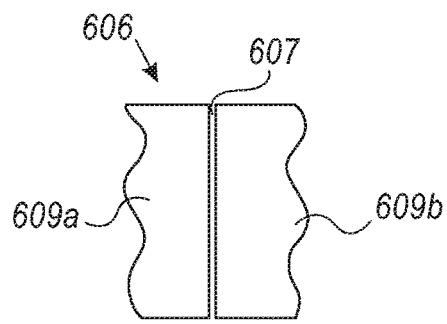
FIG. 18B is a cross-sectional view of the tab of the matrix from the inside (inner cavity of the matrix body), taken along line 18B-18B of FIG. 18A.
Figure 18C:
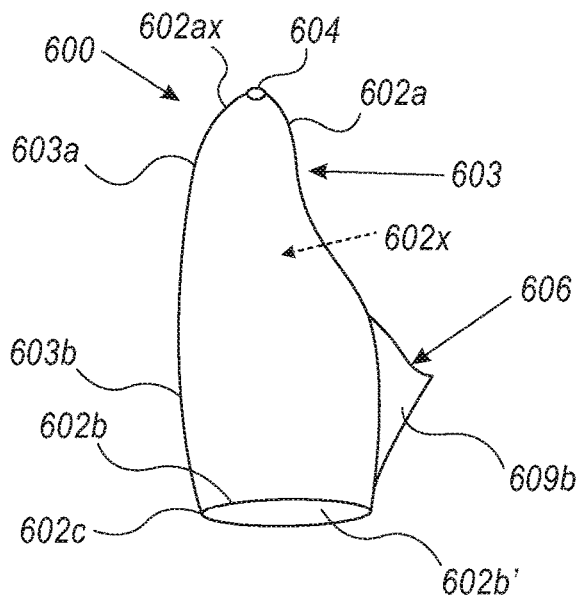
FIG. 18C is a diagram of a lateral side view of the matrix.

In FIGS. 18A-18D show a matrix 600, for example, for use in forming a dental prosthetic, such as a crown for a tooth. FIGS. 18A, 18B, and 18C show the matrix 600 in a retracted position, for example, when placed over the prepared area of the tooth and the gum, and then filled with material and cured, and an expanded position in FIG. 18D, when the crown 655 is complete, and the matrix 600 is to be removed from the tooth (with the newly formed crown 655 thereon).

The matrix 600 is of similar materials to the matrix 400, which is described above and shown in the respective drawing figures (e.g., FIGS. 13-17C). The matrix 600 includes a body 602, also known as a matrix body or body portion. The body 602 includes a wall 603, which, for example, is continuous, and for description purposes, includes a first portion 603a, at the first (closed) end 602a of the matrix 600/body 602, and a second portion 603b at the second (open) end 602b of the body 602, which includes an opening 602b' into an inner cavity 602x of the matrix 600/body 602. The opening 602b' is at a cervical area 602c of the matrix 600/body 602.

An aperture 604 is, for example, at the first or closed end 602a of the body 602, extends through the wall 603 to the inner cavity 602x. Through this aperture 604, curable material to make the crown (FIGS. 19A-19G) is filled into the inner cavity 602x of the body 602 of the matrix 600, in accordance with the processes detailed further below. While the aperture 604 is typically at the edge 602ax of the first or closed end of the body 602, it may also be anywhere on the body 602.

The matrix 600, when in the retracted position (FIGS. 18A-18C), is tapered inward from the first end 602a to the second end 602b, with the second end 602b terminating in the opening 602b' (into the inner cavity 602x) at the cervical area 602c. The matrix 600 is placed such that the opening 602b' (at the edge of the second or open end 602b), which is of a size to fit over the prepared tooth, is placed over the prepared tooth, and the cervical area 602c is in contact with or proximate to the gum, as shown in FIGS. 19A-19E, and described below. The opening 602b' is in communication with the inner cavity 602x of the matrix 600/body 602. The opening 602b' remains of a size sufficient to fit over a prepared tooth/crowned tooth, when the matrix 600 is in both the retracted position and the expanded position.

The matrix 600 is shaped to correspond to the crown of the particular tooth type, for which the crown is being made. While the matrix 600 shown is for a crown for an incisor, this matrix 600 may be made for crowns and other prosthetics for other tooth types. The matrix 600 is such that the wall 603 is of a thickness (e.g., approximately 0.05 to 0.07 mm) so as to fit in the interproximal space between teeth, in order to create frictional forces with the adjacent teeth (one of the teeth being the operative tooth). The frictional forces provide sufficient force to maintain the matrix 600 on the tooth (e.g., in a snug manner) (similar to the matrix 400 for the veneer, as detailed above), so as to hold the shape and dimensions of the matrix 600 (e.g., crown) during the processes in making the crown 655, as detailed below, including injecting and/or curing of the material.

Figure 18D:
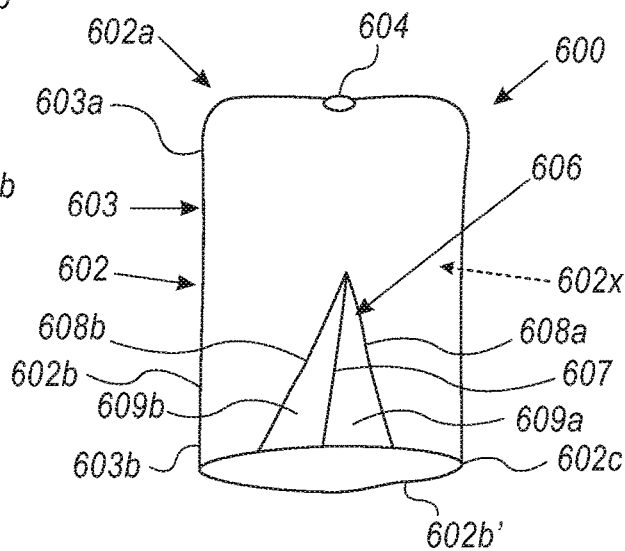
FIG. 18D is a diagram of a side view of the matrix and the tab of the matrix being expanded, such that the matrix moves from a retracted (contracted) position to an expanded position; and, FIGS. 19A-19G are diagrams showing the matrix of FIGS. 18A-18D being used to form a crown on a tooth in accordance with an embodiment of the disclosure.

The matrix 600 includes a tab 606, which is a formed of three folds 607, 608a, 608b, a main or intermediate fold 607, with lateral folds 608a, 608b, on opposite sides of the intermediate fold 607. Flanges 609a, 609b are between the intermediate fold 607 and each lateral fold 608a, 608b. For example, the main or intermediate fold 607 is a central fold (with respect to the flanges 609a, 609b), as the tab 606 is symmetric. The tab 606 is, for example triangular, so as to open and allow the body 602 (and the cavity opening 620b') to expand outward, to a diameter at least equal to and typically greater than that of the newly formed crown, as shown in FIG. 18D, so as to be easily removable from the completed tooth with the new crown. While a triangular shaped tab 606 is shown, other shapes, such as rectangular, rounded or combinations thereof are also suitable.

The tab 606, may be held in the closed or retracted position by the clinician (pinching the flanges 609a, 609b together about the central fold 607), during filling with material and curing, and then either manually moved to the expanded position, or the pinching simply released by the clinician, and the tab 606 by virtue of the material from which it is made being resilient, exhibits spring-like behavior and under its own power, moves (unfolds) to expanded position. Alternately, the tab 606, in its retracted position, can be held together by the flanges 609a, 609b initially being glued (e.g., with a dental or surgical glue, welds or heat boning attachment) or otherwise affixed to each other. When expansion is desired, the clinician simply breaks the bond of the glue, by separating the flanges 609a, 609b, form each other, and manually expands the body 602, or the body 602 is of material resilient enough, such that once the flanges 609a, 609b are separated, they expand under their own power, to the expanded position, shown in FIG. 18D. Also expansion may be by a combination of manual force coupled with the resiliency (e.g., spring-like behavior) of the material of the tab 606.

Figures 19A, 19B, 19C, 19D:
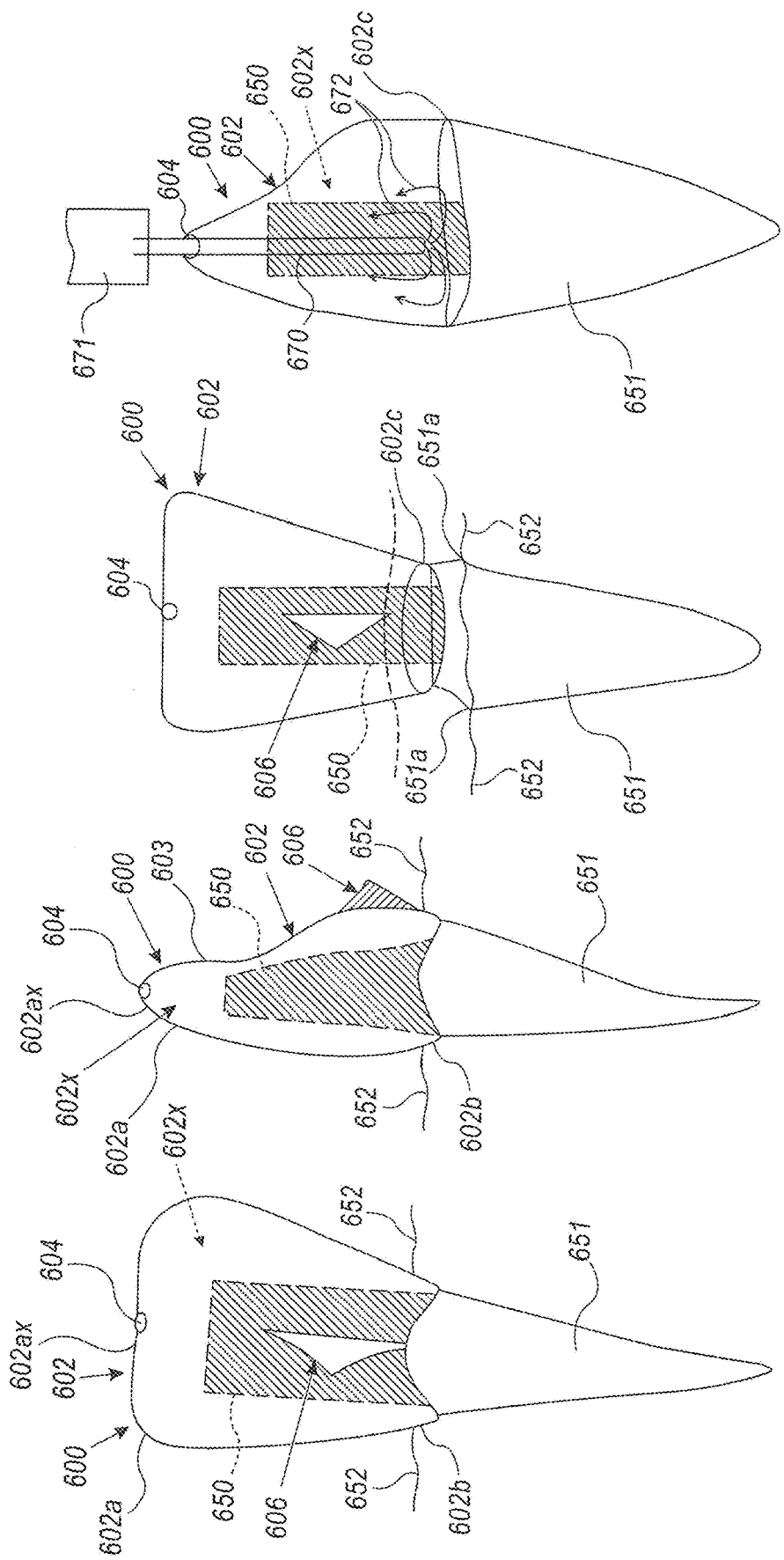

FIGS. 19A-19G show an example process using the matrix 600 to form a crown on a tooth. FIGS. 19A-19E show the matrix 600 in the retracted position, as the tab 606 is in the retracted position. FIG. 19F shows the matrix in the expanded position, with the tab 606 in the expanded position, with the second portion of the wall 603b at the second or closed end 602b (having expanded outward from the initial inward position, shown in broken lines 603b') expanded (in the direction of the arrows 618) to the expanded position (solid lines for the second portion 603b) to a diameter at least approximately equal to the first wall portion 603a. FIG. 19G shows the completed crown 655 for the tooth with the matrix removed.

In FIGS. 19A and 19B, the tooth, now a prepared tooth 650 (shown with its root 651 within the gum 652 and oral tissues), has been prepared for a crown, and a matrix 600 has been placed over a predefined dental area, for example, the prepared tooth 650, at the gum 652.

In FIG. 19C the cervical area 602c is analyzed to determine whether it needs to be cut to increase its diameter, so as to properly seat at the edge 651a of the root 651 of the tooth. As shown in FIG. 19C, the cervical area 602c has been cut (at the broken lines) to seat at the edge 651a of the root 651, in the gum 652.

In FIG. 19D, the matrix 600 is now properly positioned over the prepared tooth 650 and filled with curable material 653. A syringe needle 670 attached to a syringe 671 (similar to the syringes, e.g., syringe 60, detailed above) filled with flowable and curable composite material 653 is inserted into the inner cavity 602x of the matrix 600, and moved toward the gum 652. Filling of the curable material 653 now begins as the material (indicated by the arrows 672) flows outward from the needle 670, while the syringe needle 670 is gradually moved outward and removed from the aperture 604.

In FIG. 19E, the matrix body 602 in the inner cavity 602x is filled with curable composite material 653 (for example, through a syringe, as detailed above for matrices 10, 10', 10", 10''', 400), through the aperture 604, until the filling is complete. Once the matrix body 602 is filled, optionally, the syringe may be removed. The curable material 653 filling the matrix body 602, in the inner cavity 602x, may now be cured, for example, by UV light curing, as shown for the matrices 10, 10', 10", 10''', 400, above, in the same or a similar manner.

In FIG. 19F, the now cured and prepared crown 655 is within the matrix 600. Optionally, if the syringe 671 (and needle 670) is still attached to the matrix 600, it may now be removed, for example. The tab 606 is now, released from being held together by the clinician or instrumentation so as to unfold, is manually unfolded, by the clinician using instruments, or combinations of automatically unfolding and assistance in unfolding with instruments. The unfolding of the tab 606 expands the diameter of the second end 602b of the matrix. The expansion is such that the second end 602b, at the second wall portion 603b and cervical area 602c, moves outward, from its initial retracted (contracted) positions (the wall portion 603b in the previous closed position shown in broken lines 603b'), outward, to the expanded position (wall portion 603b shown in solid lines), where the diameter of the second end 602b and the opening 602b' is, for example, at least approximately equal to the diameter of the first portion 603a of the first end 602a (e.g., along the edge 602ax).

The matrix 600 is now removed from the tooth 660 without disrupting the newly formed crown 655. The removal is, for example, either by the clinician or by instrumentation, and if the syringe is still attached to the matrix 600, the syringe may be used in removing the matrix from the tooth 650 (by pulling the matrix 600 away from the tooth via the column 604). The tooth with the replaced crown 655 is shown at FIG. 19G.

FIGS. 20A-20E show the matrix 600 in use with a tooth implant 673. Elements of the matrix 600 are in accordance with those above.

Figure 20A:
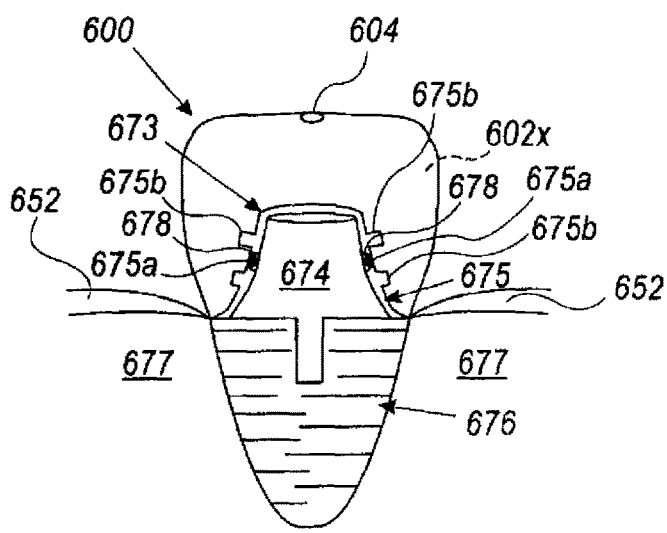
FIGS. 20A-20E are diagrams showing the matrix of FIGS. 18A-18D being used to form a crown on a tooth implant in accordance with an embodiment of the disclosure.

As shown in FIG. 20A, the matrix 600 is over a predefined dental area, for example, the abutment 674 (covered by a cap 675) of the implant, and the matrix 600 seats in the gum 652. The abutment 674 is received in the implant stem 676, which is anchored in bone 677 under the gum 652. The implant stem 676 is threaded, to, for example screw into the bone 677. The cap 675 frictionally fits over the abutment 674, for example, as friction balls 678 seat in slots 675a in the cap 675, between the abutment 674 and the cap 675. Undercuts 675b extend from the cap 675 surface. This frictional attachment allows the cap 675 to be separated from the abutment 674, including when the crown 679 has been placed on the cap 675, as shown, for example, in FIG. 20E. The cap 675, is, for example, of a plastic or polymeric material.

Alternately, the cap 675 may attach to the abutment 674, via corresponding threaded surfaces and a screw or screw-like attachment. This would allow the crown 679 to be screwed on and off from the abutment 674.

Figure 20B:
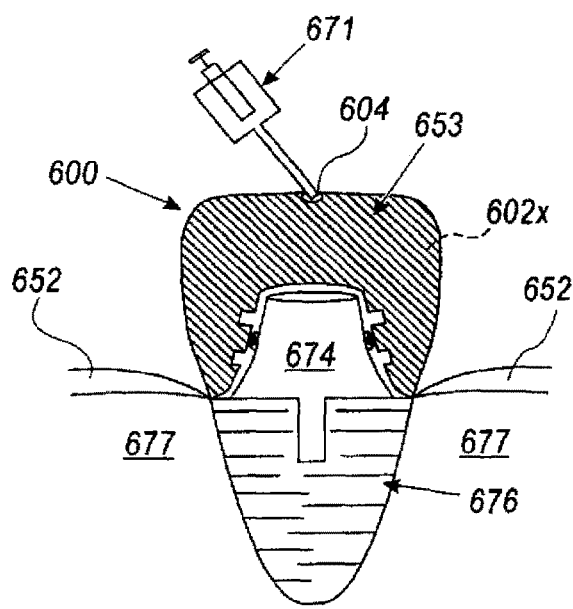

In FIG. 20B, curable material 653, to form the crown, is injected into the inner cavity 602x of the matrix 600, by a syringe 671, through the aperture 604. The curable material 653 contacts the cap 675 and the undercuts 675b for a firm adherence to the implant 673.

Figure 20C:
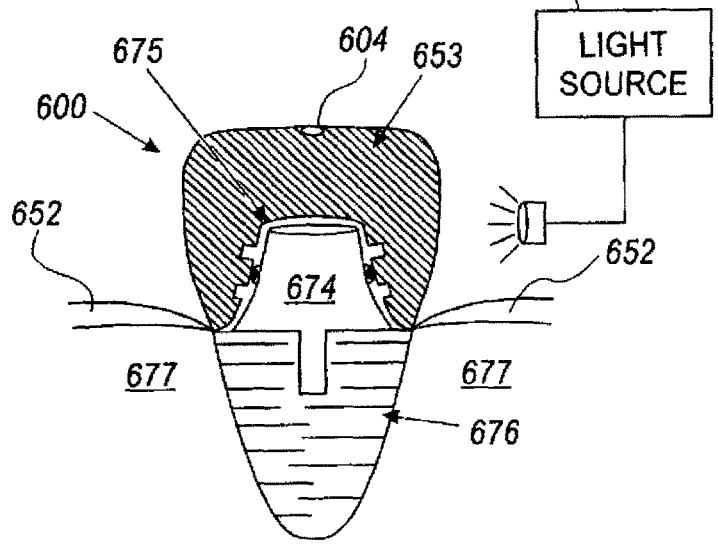
Figure 20D:
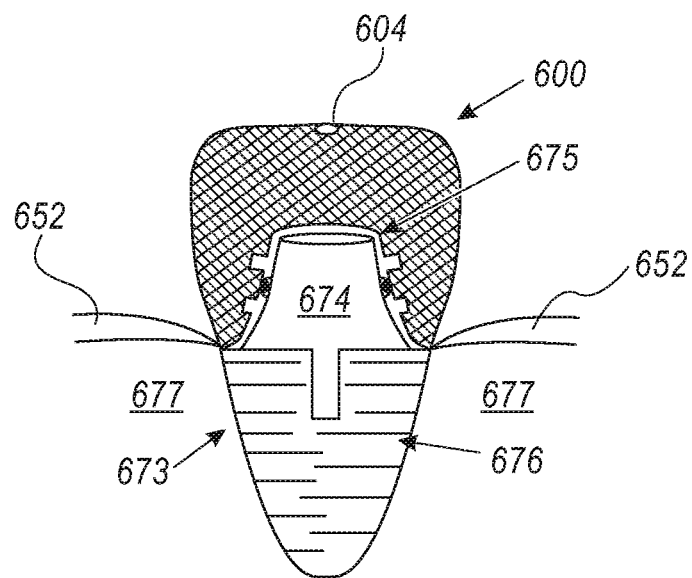
Figure 20E:
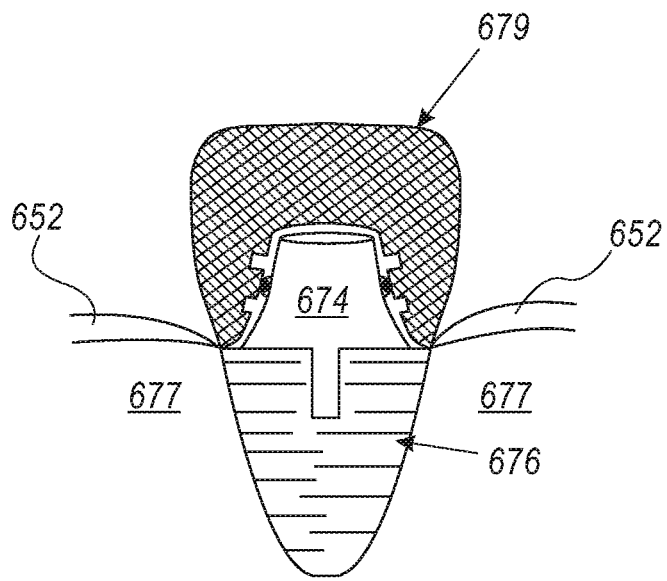

In FIG. 20C, the curing of the material 653, for example, by UV light 62 as detailed above, is complete, as shown in FIG. 20D. The matrix 600 is now expanded from its retracted position, as detailed above (i.e., FIGS. 18D and 19F), so as to be removed from the crown 679, leaving the crown 679 over the implant 673, as shown in FIG. 20E.

Figure 21A:
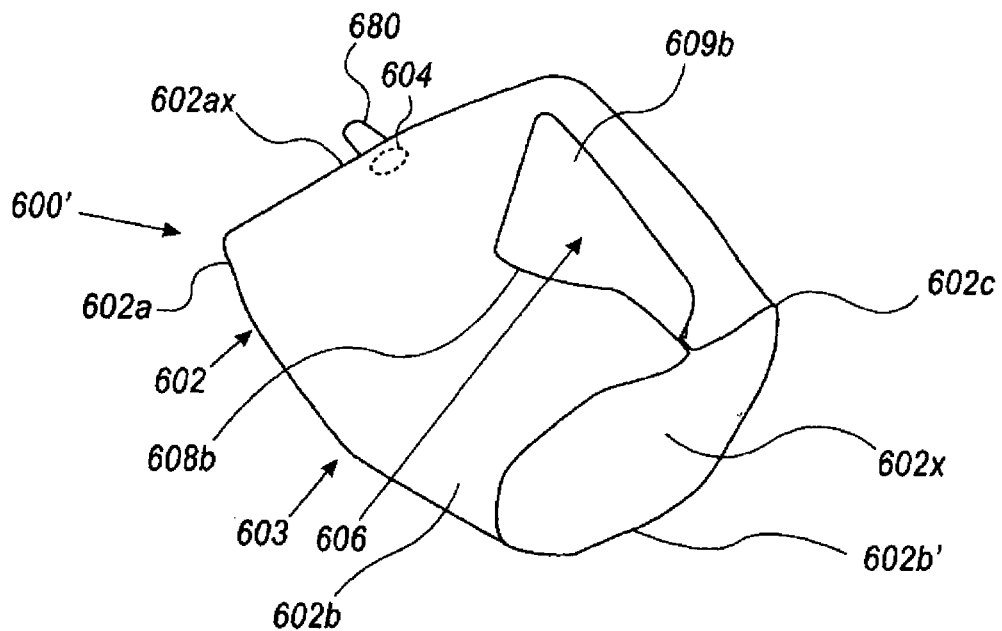
FIG. 21A is a diagram of another embodiment of a matrix used in making a crown for a tooth in a retracted position, as seen from a rear perspective view; and, FIG. 21B is a diagram of the embodiment of the matrix of FIG. 20A as seen from a front perspective view.
Figure 21B:
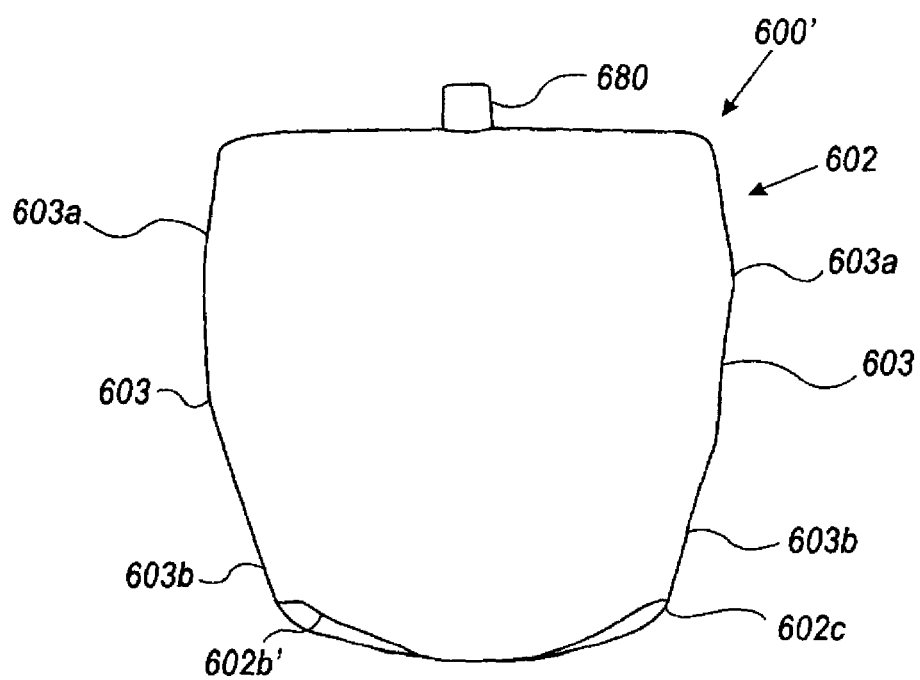

FIGS. 21A and 21B show an alternate matrix 600' similar to the matrix 600 detailed above, with identical or similar components having the same element numbers and the same descriptions as for the matrix 600 above (and shown in FIGS. 18A-18D and 19A-19G). The matrix 600' differs from the matrix 600, in that it includes a column or stalk 680, which extends from, and is in communication with, an aperture 604, through which curable material is provided to the inner cavity 602x of the matrix 600', to produce a crown, as detailed above for the matrix 600. The column or stalk 680 is similar to column 480 detailed above for the matrix 400, and as such may receive a syringe needle, for manipulation and placement of the matrix 600' and performing of the material curing processes, similar to that for the matrix 600 detailed above. While the column 680 and its aperture 604 (being open to the inner cavity 602x) are shown at the first or closed end 602a of the matrix 600'/body 602, for example, along the edge 602ax, the column 680 and aperture 604 may be located anywhere on the matrix 600'/body 602.

While the matrices and methods for creating a veneer and/or a crown on a tooth, are shown for human teeth, the disclosed matrix and methods for its use are also suitable for animal teeth.

EXAMPLES

Example 1

A dental matrix comprising: a facial portion configured to correspond to the shape of a tooth, the facial portion including oppositely disposed edges, and first and second sides; and, a flange extending from each of the oppositely disposed edges from the first side of the facial portion, each of the flanges including a portion of a thickness for engaging an operative tooth along the interproximal surface of the operative tooth and the interproximal surface of an adjacent tooth, such that the matrix is engaged between the teeth with forces sufficient to maintain the matrix in a position around at least a portion of the operative tooth.

Example 2

The dental matrix of Example 1, wherein each flange includes a tab and a wing, the tab in communication with the oppositely disposed edge of the facial portion, and the wing extending from the tab, the tab including the portion of the thickness for engaging the operative tooth along the interproximal surface of the operative tooth and the adjacent tooth.

Example 3

The dental matrix of Example 1 or Example 2, wherein each flange includes a separator between the tab and the wing, allowing the flange to be bent about the separator.

Example 4

The dental matrix of any of Example 1 to Example 3, wherein for each of the flanges, the tab is of a thickness less than the thickness of the wing.

Example 5

The dental matrix of any of Example 1 to Example 4, additionally comprising a column extending from the facial portion at the second side of the facial portion, the column including a channel extending therethrough, and the channel in communication with an area formed by the facial portion and the flanges.

Example 6

The dental matrix of any of Example 1 to Example 5, wherein the column includes a cylindrical tube, the cylindrical tube including inner walls configured to receive an instrument in a frictional engagement, allowing for the matrix to be maneuvered by the instrument.

Example 7

The dental matrix of any of Example 1 to Example 6, wherein the column includes a cylindrical tube including oppositely disposed first and second openings (apertures), the first opening including an end (e.g., outer) opening and the second (e.g., inner) opening in communication with an area formed by the facial portion and the flanges, and the channel extending between the first opening and the second opening, the cylindrical tube including tapered inner walls with the taper extending and increasing from the first opening to the second opening.

Example 8

The dental matrix of any of Example 1 to Example 7, wherein the tapered inner walls are dimensioned to receive an instrument in an engagement, allowing for the matrix to be maneuvered by the instrument.

Example 9

A dental matrix comprising: a facial portion configured to correspond to the shape of a tooth, the facial portion including oppositely disposed edges, and first and second sides; a flange extending from each of the oppositely disposed edges from the first side of the facial portion, each of the flanges for engaging an operative tooth along the interproximal surface of the operative tooth and the interproximal surface of an adjacent tooth, such that the matrix is engaged between the teeth with forces sufficient to maintain the matrix in a position around at least a portion of the operative tooth; and, a column extending from the facial portion at the second side of the facial portion, the column including a channel extending therethrough, and the channel in communication with an area formed by the facial portion and the flanges.

Example 10

The dental matrix of Example 9, wherein each of the flanges includes a including a portion of a thickness for engaging the operative tooth along the interproximal surface of the operative tooth and the interproximal surface of an adjacent tooth.

Example 11

The dental matrix of Example 9 or Example 10, wherein each flange includes a tab and a wing, the tab in communication with the oppositely disposed edge of the facial portion, and the wing extending from the tab, the tab including the portion of the thickness for engaging the operative tooth along the interproximal surface of the operative tooth and the adjacent tooth, and for each of the flanges, the tab is of a thickness less than the thickness of the wing.

Example 12

The dental matrix of any of Example 9 to Example 11, wherein each flange includes a separator between the tab and the wing, allowing the flange to be bent about the separator.

Example 13

The dental matrix of any of Example 9 to Example 12, wherein the column includes a cylindrical tube, the cylindrical tube including inner walls configured to receive an instrument in an engagement, allowing for the matrix to be maneuvered by the instrument.

Example 14

The dental matrix of any of Example 9 to Example 13, wherein the column includes a cylindrical tube including oppositely disposed first and second openings, the first opening including an end opening and the second opening in communication with an area formed by the facial portion and the flanges, and the channel extending between the first opening and the second opening, the cylindrical tube including tapered inner walls with the taper extending and increasing from the first opening to the second opening.

Example 15

The dental matrix of any of Example 9 to Example 13, wherein the tapered inner walls are dimensioned to receive an instrument in an engagement, allowing for the matrix to be maneuvered by the instrument.

Example 16

A method for creating a veneer on a tooth. The method comprises: providing a dental matrix. The dental matrix comprises: a facial portion configured to correspond to the shape of a tooth, the facial portion including oppositely disposed edges, and first and second sides; a flange extending from each of the oppositely disposed edges from the first side of the facial portion, each of the flanges including a tab portion of a thickness for engaging an operative tooth along the interproximal surface of the operative tooth and the interproximal surface of an adjacent tooth, such that the matrix is engaged between the teeth with forces sufficient to maintain the matrix in a position around at least a portion of the operative tooth; and, a column extending from the facial portion at the second side of the facial portion, the column including a channel extending therethrough, and the channel in communication with an area formed by the facial portion and the flanges. The method then comprises: engaging an instrument, for example, a syringe with a needle extending from the syringe body, with the column (e.g., the needle entering the column to frictionally engage the column and hold the matrix on the syringe), so that the matrix is moved and maneuvered by the instrument; moving the matrix with the instrument, such that the matrix is around the tooth, and is maneuverable by the instrument to create a cavity between the matrix and the tooth, the cavity corresponding to a veneer to be created.

Example 17

The method of Example 16, wherein the moving the matrix with the instrument includes moving the matrix vertically into engagement with the tooth and each adjacent tooth, such that tab portions of the flange are positioned between the interproximal surface of the operative tooth and the interproximal surface of an adjacent tooth, such that the matrix is engaged between the teeth with forces sufficient to maintain the matrix in a position around at least a portion of the operative tooth.

Example 18

The method of Example 16 or Example 17, additionally comprising: providing curable material to form the veneer into the cavity between the matrix and the tooth, by the instrument.

Example 19

The method of any of Example 16 to Example 18, additionally comprising: curing the curable material in the cavity with light to form the veneer.

Example 20

The method of any of Example 16 to Example 19, wherein the light comprises ultraviolet light.

Example 21

A dental matrix comprising: a body configured to correspond to the shape of a tooth including a first end oppositely disposed from a second end. The body comprises: an inner cavity extending from the first end to the second end, the first end being closed and the second end comprising an opening for fitting over a predefined dental area, and, an expandable portion at least proximate to the second end including an outwardly extending expandable tab movable between a retracted position and an expanded position, such that the diameter of the second end at least proximate to the opening increases when the tab moves from the retracted position to the expanded position; and, an aperture in the body open to the internal cavity.

Example 22

The dental matrix of Example 21, wherein the tab comprises oppositely disposed flanges, separated by an intermediate fold.

Example 23

The dental matrix of Example 21 or Example 22, wherein the intermediate fold is central with respect to the oppositely disposed flanges.

Example 24

The dental matrix of any one of Example 21 to Example 23, wherein the tab opens about the intermediate fold when the body moves from the retracted position to the expanded position.

Example 25

The dental matrix of any one of Example 21 to Example 24, wherein the first end is of a first diameter and the second end extends from a second diameter when the tab is in the retracted position, to a diameter of approximately the first diameter when the tab has moved to the expanded position.

Example 26

The dental matrix of any one of Example 21 to Example 25, wherein the aperture is at the first end of the body.

Example 27

The dental matrix of any one of Example 21 to Example 26, additionally comprising: a cylinder extending from the body in communication with the aperture.

Example 28

The dental matrix of any one of Example 21 to Example 27, wherein the cylinder includes a bore extending therethrough, the bore configured to receive a portion of a syringe for filling the internal cavity of the body with curable material.

Example 29

The dental matrix of any one of Example 21 to Example 28, wherein the shape of tooth includes a shape of a crown of the tooth.

Example 30

A method for making a prosthetic dental structure, for example, a crown of a tooth, comprising: providing a matrix comprising: a body configured to correspond to the shape of a tooth including a first end oppositely disposed from a second end. The body comprises: an inner cavity extending from the first end to the second end, the first end being closed and the second end comprising an opening for fitting over a predefined dental area, and, an expandable portion at least proximate to the second end including an outwardly extending expandable tab movable between a retracted position and an expanded position, such that the diameter of the second end at least proximate to the opening increases when the tab moves from the retracted position to the expanded position; and, an aperture in the body open to the internal cavity. The matrix is placed over a predefined dental area in the mouth, curable material is placed into the inner cavity of the matrix, the curable material is cured, for example by ultraviolet (UV) light curing; and, the body is moved by moving the tab from the retracted position to the expanded position.

Example 31

The method of Example 30, wherein the body is moved such that the diameter of the second end is approximately equal to the diameter of the first end.

Example 32

The method of Example 30 or Example 31, additionally comprising: removing the matrix from the prosthetic dental structure.

Example 33

The method of any of Example 30 to Example 32, wherein the prosthetic dental structure includes a crown.

Example 34

The method of any of Example 30 to Example 33, wherein the predefined dental area includes at least one of: a prepared tooth, a prepared tooth portion, a gum, or a dental tooth implant.

It will be appreciated that the above descriptions are intended only to serve as examples, and that many other embodiments are possible within the scope of the present invention as defined in the appended claims.

The invention claimed is:
1. A dental matrix comprising:
a body configured to correspond to the shape of a tooth including a first end oppositely disposed from a second end, the body comprising:
an inner cavity extending from the first end to the second end, the first end being closed and the second end comprising an opening for fitting over a predefined dental area;
an expandable portion at least proximate to the second end including an outwardly protruding tab extending vertically along the body from the second end, the tab including oppositely disposed overlapping folded flanges joining along a fold, such that the tab is movable by separating the overlapping folded flanges about the fold, between a retracted position and an expanded position, such that the diameter of the second end at least proximate to the opening increases when the tab moves from the retracted position to the expanded position; and
an aperture in the body open to the inner cavity.
2. The dental matrix of claim 1, wherein the fold is positioned intermediate the oppositely disposed overlapping folded flanges.
3. The dental matrix of claim 2, wherein the fold is central with respect to the oppositely disposed overlapping folded flanges.
4. The dental matrix of claim 2, wherein the tab opens about the fold when the body moves from the retracted position to the expanded position.
5. The dental matrix of claim 1, wherein the first end is of a first diameter and the second end is at a second diameter when the tab is in the retracted position, the second end extending to a diameter of approximately the first diameter when the tab has moved to the expanded position.
6. The dental matrix of claim 1, wherein the aperture is at the first end of the body.
7. The dental matrix of claim 6, additionally comprising: a cylinder extending from the body in communication with the aperture.
8. The dental matrix of claim 7, wherein the cylinder includes a bore extending therethrough, the bore configured to receive a portion of a syringe for filling the inner cavity of the body with curable material.
9. The dental matrix of claim 1, wherein the shape of tooth includes a shape of a crown of the tooth.
10. A method for making a prosthetic dental structure comprising:
providing a matrix comprising:
a body configured to correspond to the shape of a tooth including a first end oppositely disposed from a second end, the body comprising:
an inner cavity extending from the first end to the second end, the first end being closed and the second end comprising an opening for fitting over a predefined dental area;

an expandable portion at least proximate to the second end including an outwardly protruding tab extending vertically along the body from the second end, the tab including oppositely disposed overlapping folded flanges joining along a fold, such that the tab is movable by separating the overlapping folded flanges about the fold, between a retracted position and an expanded position, such that the diameter of the second end at least proximate to the opening increases when the tab moves from the retracted position to the expanded position; and an aperture in the body open to the inner cavity;

placing the matrix over a predefined dental area;

placing curable material into the inner cavity of the matrix;

curing the curable material; and, moving the body by moving the tab from the retracted position to the expanded position.

11. The method of claim 10, wherein the body is moved such that the diameter of the second end is approximately equal to the diameter of the first end.

12. The method of claim 10, additionally comprising: removing the matrix from the prosthetic dental structure.

13. The method of claim 10, wherein the prosthetic dental structure includes a crown.

14. The method of claim 10, wherein the predefined dental area includes at least one of: a prepared tooth, a prepared tooth portion, a gum, or a dental tooth implant.

* * * * *